United States Patent
Brierley et al.

(10) Patent No.: US 8,799,208 B2
(45) Date of Patent: Aug. 5, 2014

(54) METHOD AND SYSTEM FOR EVALUATING, REPORTING, AND IMPROVING ON-LINE PROMOTION EFFECTIVENESS

(75) Inventors: Harold M. Brierley, Dallas, TX (US);
John R. Rothwell, Dallas, TX (US);
James C. Niemann, Addison, TX (US);
Frank M. Hamlin, Dallas, TX (US);
Bernard D. Feiwus, Plano, TX (US)

(73) Assignee: e-Rewards, Inc., Dallas, TX (US)

( * ) Notice: Subject to any disclaimer, the term of this patent is extended or adjusted under 35 U.S.C. 154(b) by 0 days.

(21) Appl. No.: 09/519,266

(22) Filed: Mar. 7, 2000

(65) Prior Publication Data

US 2002/0161779 A1    Oct. 31, 2002

(51) Int. Cl.
*G06F 7/00*     (2006.01)
*G06G 7/00*     (2006.01)

(52) U.S. Cl.
USPC .......................................... 707/603; 705/7.32

(58) Field of Classification Search
USPC ................. 705/14, 10, 26, 27, 7.32; 707/100, 707/104.1, 603
See application file for complete search history.

(56) References Cited

U.S. PATENT DOCUMENTS

| | | | |
|---|---|---|---|
| 4,602,279 A | 7/1986 | Freeman | 725/30 |
| 4,658,290 A | 4/1987 | McKenna et al. | 720/14 |
| 4,799,156 A | 1/1989 | Shavit et al. | 705/26 |
| 4,850,007 A | 7/1989 | Marino et al. | 379/114.13 |
| 4,970,681 A | 11/1990 | Bennett | 707/3 |
| 4,992,940 A | 2/1991 | Dworkin | 705/26 |
| 5,025,372 A | 6/1991 | Burton et al. | 705/14 |
| 5,034,807 A | 7/1991 | Von Kohorn | 725/5 |
| 5,056,019 A | 10/1991 | Schultz et al. | 705/14 |
| 5,155,591 A | 10/1992 | Wachob | 725/35 |
| 5,201,010 A | 4/1993 | Deaton et al. | 382/139 |
| 5,227,874 A | 7/1993 | Von Kohorn | 705/10 |
| 5,283,731 A | 2/1994 | Lalonde et al. | 705/1 |
| 5,305,195 A | 4/1994 | Murphy | 705/1 |
| 5,347,632 A | 9/1994 | Filepp et al. | 709/232 |
| 5,483,444 A | 1/1996 | Heintzeman et al. | 623/1.11 |
| 5,515,098 A | 5/1996 | Carles | 725/35 |
| 5,515,270 A | 5/1996 | Weinblatt | 705/14 |
| 5,561,763 A * | 10/1996 | Eto et al. | 714/35 |
| 5,708,780 A | 1/1998 | Levergood et al. | 709/229 |
| 5,715,314 A | 2/1998 | Payne et al. | 705/78 |
| 5,740,549 A | 4/1998 | Reilly et al. | 705/14 |
| 5,749,075 A * | 5/1998 | Toader et al. | 705/14 |

(Continued)

FOREIGN PATENT DOCUMENTS

EP    265 232 A3    2/1990
EP    308 224 A3    9/1990

(Continued)

*Primary Examiner* — James Trujillo
*Assistant Examiner* — Dawaune Conyers
(74) *Attorney, Agent, or Firm* — Fulbright & Jaworski LLP

(57) ABSTRACT

A system and method for populating and analyzing a member consumer profile database for implementing an incentive driven targeted product marketing program is disclosed. To implement the targeted product marketing program, personal profile information is collected from several member consumers and stored in a profile database. A group of the member consumers are identified and selected, and the promotion operator provides a promotion to this group on behalf of a sponsor. During and/or after the promotion, information is solicited from the member consumer about the promotion in exchange for rewards. In addition, interactive behavior information of the member consumer is tracked. The solicited information and the interactive behavior information can then be used to enrich the profile database for future promotions.

26 Claims, 27 Drawing Sheets

(56) References Cited

U.S. PATENT DOCUMENTS

| | | | |
|---|---|---|---|
| 5,765,141 A | 6/1998 | Spector | 705/14 |
| 5,774,870 A * | 6/1998 | Storey | 705/14 |
| 5,781,894 A | 7/1998 | Petrecca et al. | 705/14 |
| 5,794,210 A | 8/1998 | Goldhaber et al. | 705/14 |
| 5,809,481 A * | 9/1998 | Baron et al. | 705/14 |
| 5,832,457 A | 11/1998 | O'Brien et al. | 705/14 |
| 5,832,458 A | 11/1998 | Jones | 705/14 |
| 5,848,396 A | 12/1998 | Gerace | 705/14 |
| 5,848,397 A | 12/1998 | Marsh et al. | 705/14 |
| 5,855,008 A | 12/1998 | Goldhaber et al. | 705/14 |
| 5,857,175 A | 1/1999 | Day et al. | 705/14 |
| 5,864,823 A | 1/1999 | Levitan | 705/14 |
| 5,873,068 A | 2/1999 | Beaumont et al. | 705/14 |
| 5,893,075 A | 4/1999 | Plainfield et al. | 705/14 |
| 5,907,831 A | 5/1999 | Lotvin et al. | 705/14 |
| 5,915,243 A * | 6/1999 | Smolen | 705/14 |
| 5,915,244 A | 6/1999 | Jack et al. | 705/14 |
| 5,933,811 A | 8/1999 | Angles et al. | 705/14 |
| 5,937,162 A | 8/1999 | Funk et al. | 709/206 |
| 5,937,390 A | 8/1999 | Hyodo | 705/14 |
| 5,937,391 A | 8/1999 | Ikeda et al. | 705/14 |
| 5,943,654 A | 8/1999 | Goodwin, III et al. | 705/14 |
| 5,946,665 A | 8/1999 | Suzuki et al. | 705/26 |
| 5,948,061 A | 9/1999 | Merriman et al. | 709/219 |
| 5,956,693 A | 9/1999 | Geerlings | 705/14 |
| 5,966,696 A | 10/1999 | Giraud | 705/14 |
| 5,970,469 A | 10/1999 | Scroggie et al. | 705/14 |
| 5,974,396 A * | 10/1999 | Anderson et al. | 705/7.33 |
| 5,974,398 A | 10/1999 | Hanson et al. | 705/14 |
| 5,983,196 A | 11/1999 | Wendkos | 705/14 |
| 5,991,736 A | 11/1999 | Ferguson et al. | 705/14 |
| 6,009,409 A | 12/1999 | Adler et al. | 705/14 |
| 6,009,410 A | 12/1999 | LeMole et al. | 705/14 |
| 6,009,412 A * | 12/1999 | Storey | 705/14 |
| 6,012,051 A * | 1/2000 | Sammon et al. | 706/52 |
| 6,018,718 A | 1/2000 | Walker et al. | 705/14 |
| 6,061,660 A * | 5/2000 | Eggleston et al. | 705/14 |
| 6,093,026 A * | 7/2000 | Walker et al. | 434/322 |
| 6,178,408 B1 * | 1/2001 | Copple et al. | 705/14 |
| 6,183,366 B1 * | 2/2001 | Goldberg et al. | 463/42 |
| 6,216,112 B1 | 4/2001 | Fuller et al. | 705/14 |
| 6,256,614 B1 * | 7/2001 | Wecker et al. | 705/14 |
| 6,266,649 B1 * | 7/2001 | Linden et al. | 705/26 |
| 6,473,084 B1 * | 10/2002 | Phillips et al. | 345/440 |
| 6,477,509 B1 * | 11/2002 | Hammons et al. | 705/27 |
| 6,571,216 B1 | 5/2003 | Garg et al. | 705/14 |
| 6,915,271 B1 * | 7/2005 | Meyer et al. | 705/14 |
| 2002/0032668 A1 * | 3/2002 | Kohler et al. | 705/401 |
| 2007/0156677 A1 * | 7/2007 | Szabo | 707/5 |

FOREIGN PATENT DOCUMENTS

| | | |
|---|---|---|
| EP | 408 348 A2 | 1/1991 |
| WO | WO 86/03310 | 6/1986 |
| WO | WO 93/12489 | 6/1993 |
| WO | WO 95/16971 | 6/1995 |
| WO | WO/96/39668 | 12/1996 |

* cited by examiner

Request an invitation from one of our sponsors.

In the coming weeks, our sponsors will be inviting many of their customers. If you are interested in receiving an invitation, please provide the information below:

Request Invitation

- First:
- Last:
- E-mail Address:
- Confirm e-mail Address:
- Address1:
- Address2:
- City:
- State/Province: SELECT ONE
- Zip/Postal Code:

Your invitation will come to you from one of the companies listed below. Please select the company that you feel you would most like to sponsor your participation.

[ Request Invitation ]

Enrollment

Creating Your Preferences
- Basic Information
- Demographic Information
- ▷ Areas of Interests
- Major Purchases and Life Events
- Purchasing Information Percent Complete:

Please rate your interest in the following areas:

| Sports, Recreation & Fitness | Not Interested | Somewhat Interested | Very Interested |
|---|---|---|---|
| Bicycling | ● | ○ | ○ |
| Camping/Hiking/Outdoors | ○ | ● | ○ |
| Diving/Snorkeling | ○ | ● | ○ |
| Fishing | ● | ○ | ○ |
| Golf | ○ | ○ | ● |
| Health, Fitness & Wellness | ○ | ● | ○ |
| Hunting | ○ | ○ | ● |
| Running/Jogging | ○ | ● | ○ |
| Skiing/Snowboarding | ○ | ● | ○ |
| Tennis & Racquet Sports | ○ | ○ | ● |
| Water Sports/Boating | ○ | ● | ○ |
| Weightlifting/Nautilus | ○ | ○ | ● |

[Continue] [Reset]

*Fig. 5D* e-rewards

Enrollment

Creating Your Preferences
- Basic Information
- Demographic Information
- Areas of Interests
- Major Purchases and Life Events
- ▷ Purchasing Information Percent Complete:

PURCHASING INFORMATION

Do you own or rent your home?
[Own ▼]

How many vehicles do you own or lease?
[2 ▼]

Tell us about your primary vehicle:

| Category | Make | Year |
|---|---|---|
| Sedan ▼ | Toyota ▼ | 1993 ▼ |

How many air roundtrips have you taken in the past 12 months for:

Business purposes? [4-11 ▼]

Leisure purposes? [4-11 ▼]

Which airline do you most frequently use?
[American Airlines ▼]

How many nights in the past 12 months you stay in a hotel?
[6-12 ▼]

Which hotel chain do you most frequently use?
[Other ▼]

*Fig. 5F*

Fig. 5G e-rewards — Microsoft Internet Explorer

File Edit View Favorites Tools Help

Address: C:\Data\HTML\eri website\E-Rewards ERI AdvertiserInterfa\22 advertisers_home.html Links: Graphic Web Design Using Fonts, Photography, Animation and HTML – WebReference | Brierley & Partners | Cu

- Customer Service | About e-Rewards | Member Login
- Enrollment | Program Info | Redeem e-Rewards e-rewards

January 5, 2000                                           Showing: (Setup and Active)

| Date Sent | Job# | CAID# | Short Description | e-mails Sent | MicroSite Click-Through | Click-Through % | Links |
|---|---|---|---|---|---|---|---|
| Unsent | 1005 | c103 | Existing customers with income greater than 100,000. | | | | Make Selection ▼ |
| 01/04/2000 | 1004 | c101 | Existing customers who are married. | 20,000 | 15,000 | 75% | Make Selection ▼ |
| 12/15/1999 | 1003 | c100 | Existing customers who are single. | 10,000 | 7,500 | 75% | Make Selection ▼ |
| 11/30/1999 | 1002 | c99 | Existing customers named Frank. | 1 | 1 | 100% | Make Selection ▼ |
| 10/15/1999 | 1001 | c98 | Existing customers with blonde hair. | 15,000 | 3,000 | 20% | Make Selection ▼ |

Jobs Status according to criteria

Setup ☐   Canceled ☐

Active ☐   Deleted ☐

[ Show Jobs ]

Search by Job# or Customer ID

Job#: [          ]

Customer Assigned ID: [          ]

[ Search ]

*Fig. 12A*

| Offer Costs | | | |
|---|---|---|---|
| Job # 8 | | Company X | |
| Set-up Costs: | | | |
| | | Minimum: | $0.00 |
| | | Additional: | $0.00 |
| Set-up Subtotal: | | | $0.00 |
| | Event | Cost/Event | |
| Received e-mail: | 79 | $0.10 | $7.90 |
| Other Costs: | | | $0.00 |
| Event Subtotal: | | | $7.90 |
| Total Offer Cost: | | | $7.90 |

| Cost Per E-mail Sent: | $0.10 |
|---|---|
| Cost Per Microsite Read: | $0.37 |

METHOD AND SYSTEM FOR EVALUATING, REPORTING, AND IMPROVING ON-LINE PROMOTION EFFECTIVENESS

BACKGROUND OF THE INVENTION

The present invention relates generally to product advertisements and promotions, and more particularly, to a system and method for evaluating, reporting, and improving promotion effectiveness through both on-line and off-line communication channels.

With the advent of the Internet, traditional advertising and promotion activities have been rapidly transformed to cover both on-line and off-line product and service promotions. The on-line world has been integrated into the traditional market, and has become another communication channel between the provider and the purchaser of products or services. For the purpose of describing the present invention, it is understood that the term "product" includes any product or service that can be promoted.

On one hand, it is now possible to directly access a targeted customer or consumer base through new communication or presentation means such as emails and websites. On the other hand, it has become more difficult to evaluate the effectiveness of a particular promotion because the consumers have far more communication channels to receive the information about the promoted products.

It is desired to provide a promotion that is targeted to a group of selected consumers who are likely to have a serious interest in the promoted product. However, the interests of consumers are constantly changing. Thus the effectiveness of a promotion depends largely on the targeting process for determining the group of selected consumers. The targeting process not only requires significant information about the consumers in general, but the information must be correct and up-to-date. While many manufacturers and advertisers consider on-line promotions to be one of the most effective and economical way to market their products, evaluating, reporting and improving the effectiveness of the on-line product promotions remains a significant problem.

SUMMARY OF THE INVENTION

A system and method is provided for creating, evaluating, reporting, and improving on-line product promotions for a targeted product marketing program. The program is operated by a promotion operator on behalf of at least one sponsor and/or advertiser. In one embodiment, a profile database is created through a member enrollment process to recruit a plurality of consumers (hereinafter "member consumers") by the promotion operator. After its creation, the profile database may be enriched throughout and beyond the life cycle of various promotions. The present invention provides a more complete picture of how a specific promotion has affected the decision making process of a group of member consumers than any conventional method. It also may report information back to the sponsor/advertiser and the promotion operator so that future promotions can be better designed and future consumers can be targeted more closely.

In one embodiment, the profile database is constantly refined and analyzed through a dynamic profile enrichment process, a behavioral analysis process, a promotion result verification process, and a periodic profile updating process. The dynamic profile enrichment process continually enriches personal profile information of each member consumer stored in the profile database. The behavioral analysis process compliments the personal profile information with actual behavior information of the member consumer that details the website interactive actions performed by the member consumer. The promotion result verification process verifies the results of a specific promotion. The periodic profile updating process may include monthly and quarterly follow-ups with the member consumer who has received promotions from the promotion operator. It may also include periodic service driven surveys for member consumers who have expressed a negative interest about the promotion. Through these processes, the effectiveness of each promotion is ensured and the value of the profile database is improved.

Based on the profile database, various reports can be generated for the benefit of both the advertiser and the promotion operator for analyzing many aspects of the promotion and provide valuable information for improving the design of future promotions.

Since the success of the promotion depends largely on the selected group of member consumers, the promotion operator may communicate with the member consumers during and after the promotion in order to evaluate the promotion and understand the interests of the member consumers. In order to provide incentives for soliciting needed information from the member consumers, the promotion operator may provide one or more rewards to the member consumers.

BRIEF DESCRIPTION OF THE DRAWINGS

FIGS. 3B-3C, 5B-5I, and 8B-8E illustrate screen displays for implementing consumer enrollment and database enrichment processes of the promotion system and method of FIG. 2.

FIGS. 9-10, 11A, and 12A are flowcharts for illustrating database enrichment and profile analysis processes of the promotion system and the method of FIG. 2.

DESCRIPTION OF THE PREFERRED EMBODIMENT

The present invention provides a unique system and method for creating, evaluating, reporting, and improving product promotions in a communications network. It is understood that the following disclosure provides many different embodiments, or examples, for implementing different features of this invention. Therefore, specific examples of networks, components, entities, and properties are described below to simplify the present disclosure. These are, of course, merely examples and are not intended to limit the invention from that described in the claims.

The following disclosure is separated, for the sake of clarity, into four discussions: 1) an exemplary network; 2) method summary; 3) consumer enrollment and database enrichment processes; and 4) further database enrichment and profile analysis processes. Each of the discussions focuses on one or more examples for implementing the invention. To simplify the following disclosure, many examples are continued through each of the discussions.

1. Exemplary Network

Figure 1:
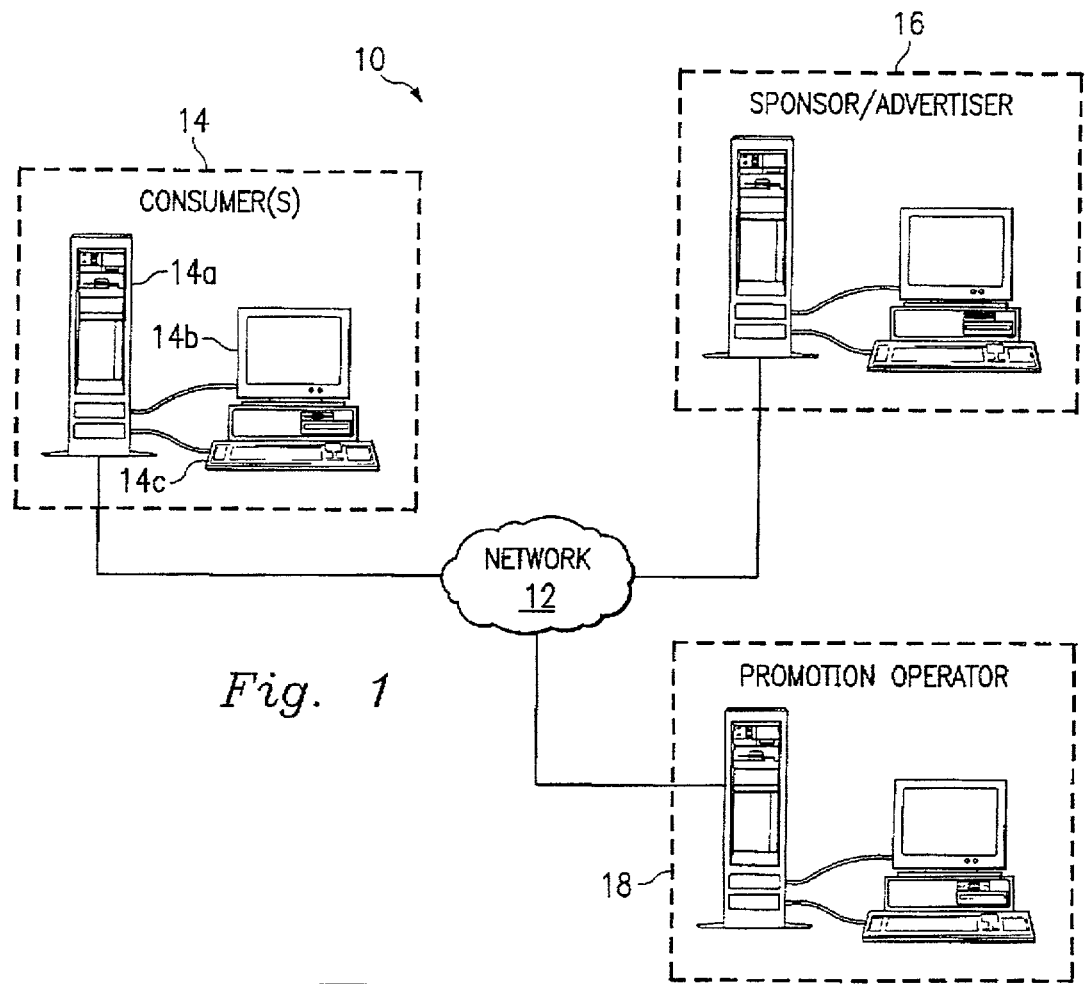
FIG. 1 illustrates a simplified communication system including at least three computers and a network, the system being used for implementing one embodiment of the present invention.

Referring now to FIG. 1 of the drawings, the reference numeral 10 designates, in general, a typical communication system. The system 10 is centered around a network 12, which may be any combination of the Internet, local area networks, telephone network, and intranets. For the sake of example, the network 12 will be considered to be the Internet and will utilize Transfer Control Protocol/Internet Protocol (TCP/IP) to transmit data between various nodes connected to the network. Communication techniques such as Secure Sockets Layer (SSL) or Secure HyperText Transmission Protocol (HTTPS) can also be used to provide extra security for certain transactions.

Many nodes may be attached to each other through the network 12, represented by three nodes 14, 16, and 18. The nodes 14-18 are illustrated as personal computers, but it is understood that each node can actually represent one or more different computing devices, including mainframes, servers, wireless telephones, personal digital assistants, television devices and the like.

Referring to node 14 for example, the node includes a processing unit, a memory, and a network interface, generally represented as computer 14a. The computer 14a also includes a consumer interface, which in the present example includes a monitor 14b and a keyboard 14c. It is understood that each of the listed components may actually represent several different components. For example, the computer 14a may actually represent a distributed processing system including different levels of main memory, hard disks, server/client memory, and remote storage locations. Furthermore, it is understood that, in many implementations, the nodes 14, 16, and 18 may be configured differently from each other and/or may have different components.

For the sake of reference, the node 14 will represent one or more potential consumers of goods and/or services provided through the network 12. The node 16 will represent one or more sponsors and/or advertisers desiring to advertise or sell goods or services over the network 12. The node 18 will represent a promotion operator for helping the sponsor/advertiser 16 with certain promotions of their goods and services.

2. Method Summary

The present invention provides a method for populating and analyzing a member consumer profile database for implementing an incentive driven targeted product marketing program. The targeted product marketing program begins with identifying and registering a plurality of consumers 14. Once registered, the consumers are "member consumers." The promotion operator 18 can then deliver promotions directly to selected groups of the member consumers 14 (a "segment") for the benefit of the promotion sponsor/advertiser 16.

Since the effectiveness of the promotion depends on identifying the segment of member consumers 14 who are likely to purchase the promoted product, the promotion operator solicits specific information to facilitate the selection of the segment. The information may be retrieved from the member consumers 14 in various occurrences before, during, and after the promotion(s). The promotion operator 18 may explicitly request information from the member consumer 14, or may derive information responsive to the member consumer's behavior during the promotion. In some embodiments, the member consumers 14 provide this information in exchange for "reward points" or "reward money." The information may then be stored in one or more databases.

Figure 2:
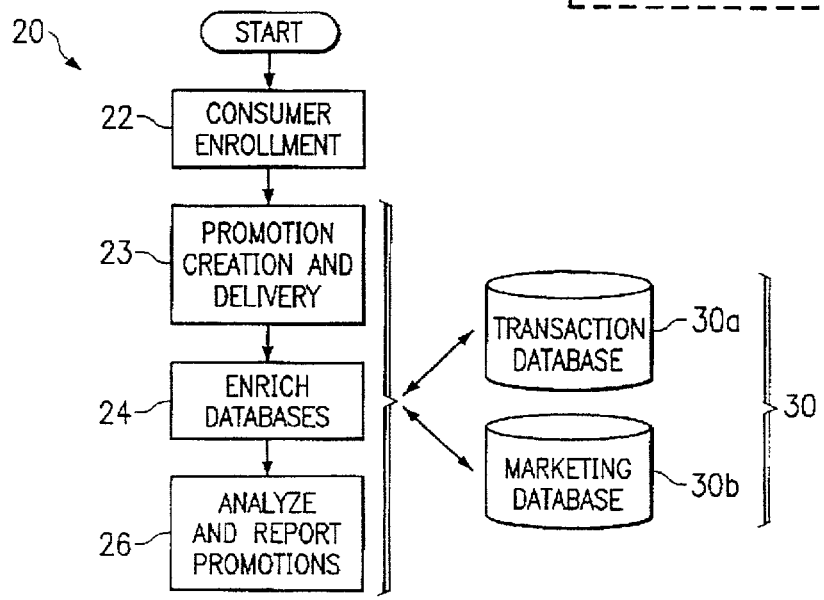
FIG. 2 illustrates an incentive driven on-line product promotion system and method according to one embodiment of the present invention.

Referring now to FIG. 2, a method 20 can be used to create, evaluate, report, and/or improve product promotions for the sponsor/advertiser 16 through the network 10. The method is generally performed by the promotion operator 18, with inputs from the member consumer 14 and the sponsor/advertiser 16. It is understood that certain steps and processes of the method 20 can be distributed throughout the network 12.

At step 22, one or more databases 30 are populated with the enrollment, or registration, of the one or more consumers 14. The method allows for the consumers 14 to register with the promotion operator 18 to receive rewards in exchange for reviewing promotion information through the network 12. Registration may include a series of questions asked by the promotion operator 18, including information about the member consumer's network activities and information relating to the promotions provided by the sponsors and/or advertisers 16.

For the sake of example, the profile database 30 is illustrated as including a transaction database 30a and a marketing database 30b. The transaction database 30a includes information that is specific to the consumers 14 and obtained from the member consumers through interactions between the promotion operator 16 and the member consumers 14. The marketing database 30b is an analytical repository that includes various types of information, including data that is specific to the sponsors/advertisers 16 and extracts of data from the transaction database 30a. It is understood that these two databases 30a, 30b are merely functional representations, and may actually refer to a single database or many distributed databases.

At step 23, a segment of member consumers is identified and a promotion program is provided to the segment. The promotion program may be designed by the promotion operator, responsive to information received during registration (and elsewhere).

At step 24, the profile database 30 is constantly "enriched." The enrichment is facilitated by the member consumers 14 accessing and evaluating certain promotions. For example, the promotion operator 18 may ask the member consumers 14 to evaluate and/or rate the promotions. This evaluation and/or rating process may occur during the promotion, or after the promotion has ended.

The enrichment is further facilitated by performing dynamic analysis of the member consumers actions during the promotion. For example, behavior information such as how many member consumers accessed the promotion, how long the promotion was actively reviewed, how many consumers selected embedded links (internal subsets) of the promotion, and so forth may be recorded. Alternatively or in addition, the promotion results may also be verified with the sponsor/advertiser 16.

At step 26, by analyzing the enriched and updated profile database 30, the promotion operator 18, and thus the sponsors/advertisers 16, can obtain valuable information with respect to the effectiveness of various promotions. This may include historical rating information given by each member consumer 14 for similar promotions, average rating information of similar promotions, average rating information of all selected member consumers, and statistical distribution information based on rating information collected. This analysis enables the promotion operator 18 to create various promotion reports if necessary.

The method 20 can be implemented by performing various processes discussed below. The processes can be performed in various order, several processes can be simultaneously implemented, and some processes may not be performed at all.

3. Consumer Enrollment and Database Enrichment Processes

Figures 3A, 4:
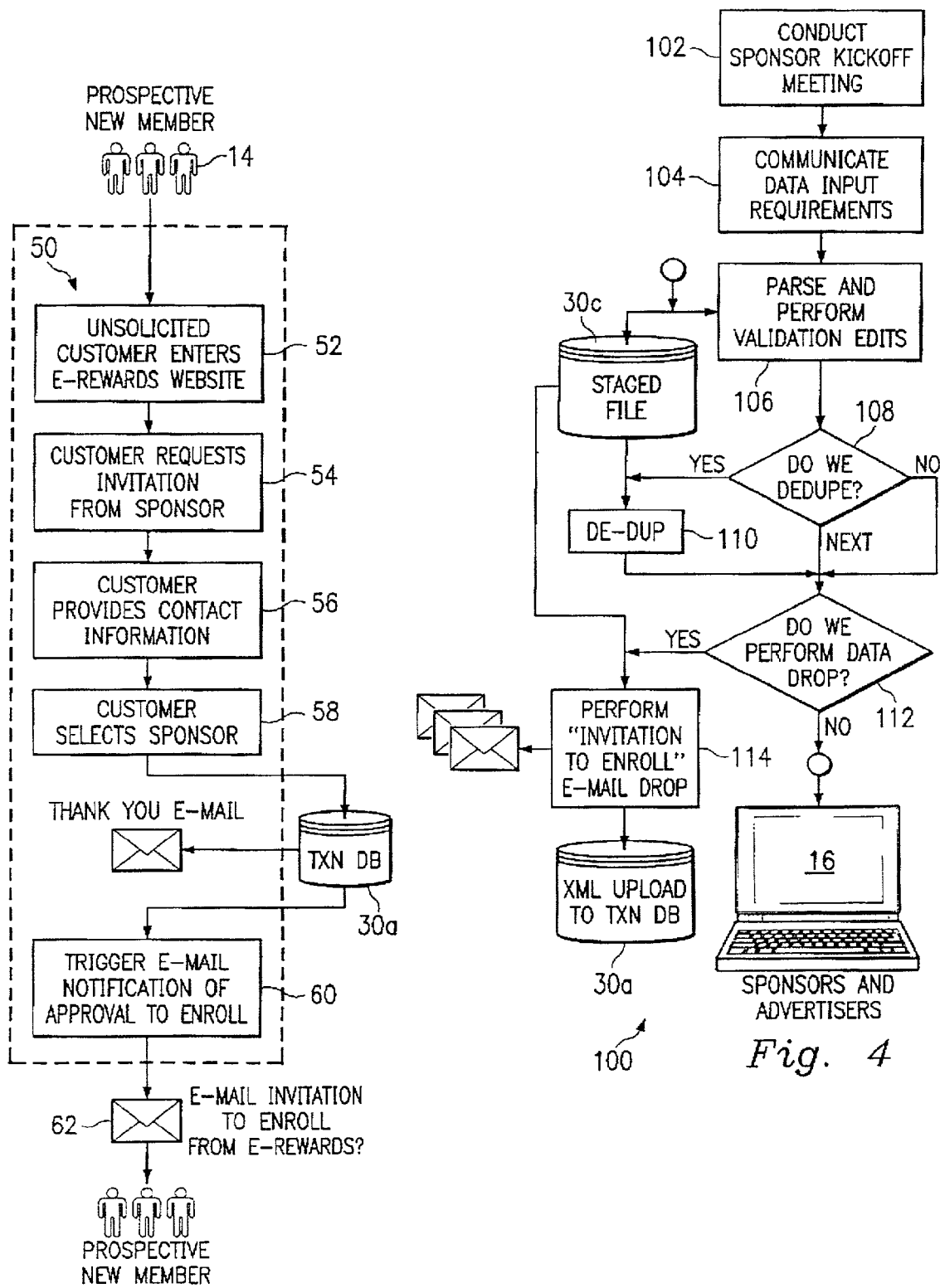
FIGS. 3A, 4, 5A, 6, 7, and 8A are flowcharts for implementing consumer enrollment and database enrichment processes of the promotion system and method of FIG. 2.

Referring now to FIGS. 3A-3C and FIG. 4, there are various ways to accomplish consumer enrollment. A member-centric invitation process 50 is illustrated in FIG. 3A, and a sponsor/advertiser-centric invitation process 100 is illustrated in FIG. 4. Although the present embodiments provide a by-invitation rewards program, it is understood that other types of programs may also utilize the present invention.

Referring specifically to FIG. 3A, at step 52, a member consumer 14 may access a predetermined website, such as one owned and operated by the sponsor/advertiser or the promotion operator 18. At step 54, the consumer 14 requests invitation from the sponsor/advertiser 16 or directly from the promotion operator 18. At step 56, the consumer 14 provides contact information to the promotion operator 18 and at step 58 the consumer selects a sponsor 16 (if not already selected). The sponsor 16 may later "approve" of the consumer's enrollment.

Figure 3C:
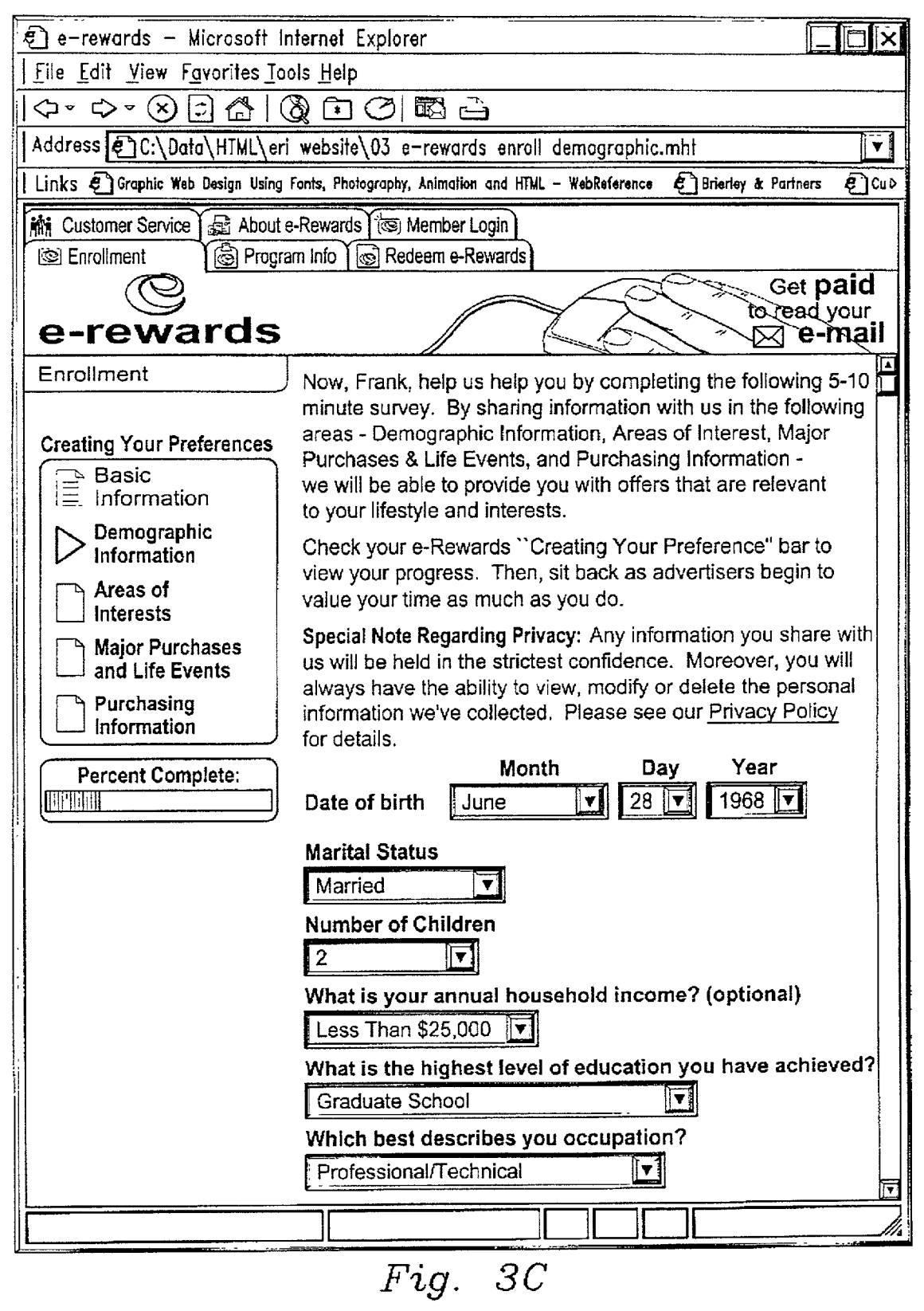

Referring also to FIGS. 3B and 3C, in the present embodiment, the consumer 14 provides the contact information, as well as additional demographic information, on two screen displays 59a, 59b. The information provided by the consumer 14 is then stored in the transaction database 30a.

At step 60 of FIG. 3A, the consumer 14 is notified of his approval to enroll (if so approved). This notification can be by an e-mail shown at step 62, by post card, or other means. The approval may have associated with it an invitation code. If the notification is provided via e-mail, a link to a registration website may be provided and the invitation code may be embedded in the link.

Referring now to FIG. 4, the sponsor/advertiser-centric invitation process 100 is similar to the member-centric invitation process 50 of FIG. 3A, with some exceptions. The primary objective of this process is the creation and distribution of invitations via an email, post card, or other message directly to the consumer 14, with an invitation code. At step 102, the promotion operator initiates a planning process with the sponsor/advertiser 16. At steps 104-106, either the consumer 14 or the sponsor 16 may provide, as an option, certain data requirements (e.g., names and addresses) about the consumer to the promotion operator 18, who then validates the information. The data requirements may be stored in a Staged File database 30c. At steps 108-110, a decision is made to avoid redundant information in the database. That is, the consumer information provided at step 104 is compared to a list of consumers that have already enrolled, thereby preventing confusion of the member consumers 14 and unnecessary costs. At step 112, the sponsor 16 also has the choice of submitting the invitations directly to the consumers 14. Otherwise, at step 114 the promotion operator 18 sends an enrollment invitation to the consumers 14, such as at step 62 of FIG. 3A, above.

Figure 5A:
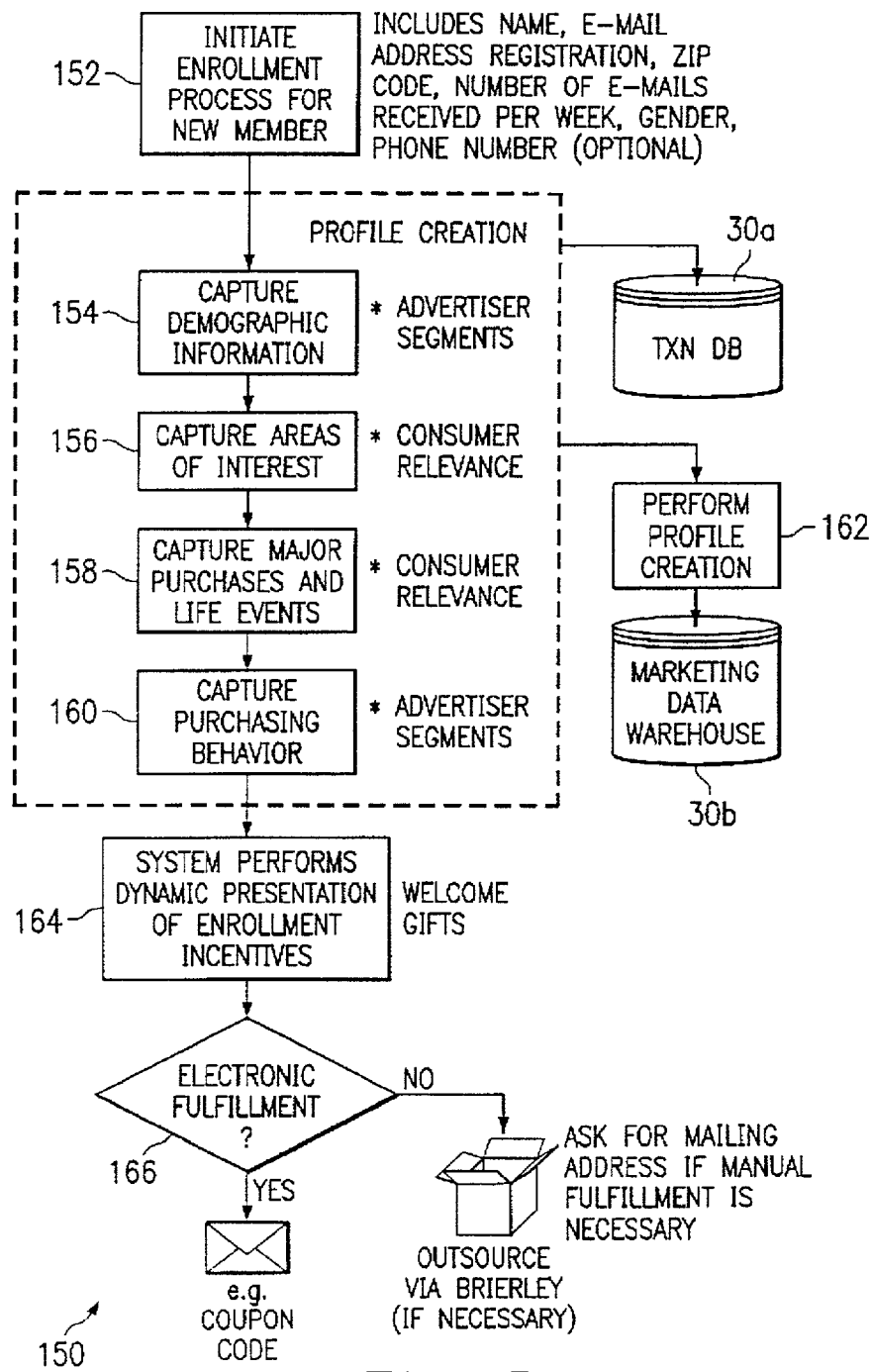
Figure 5B:
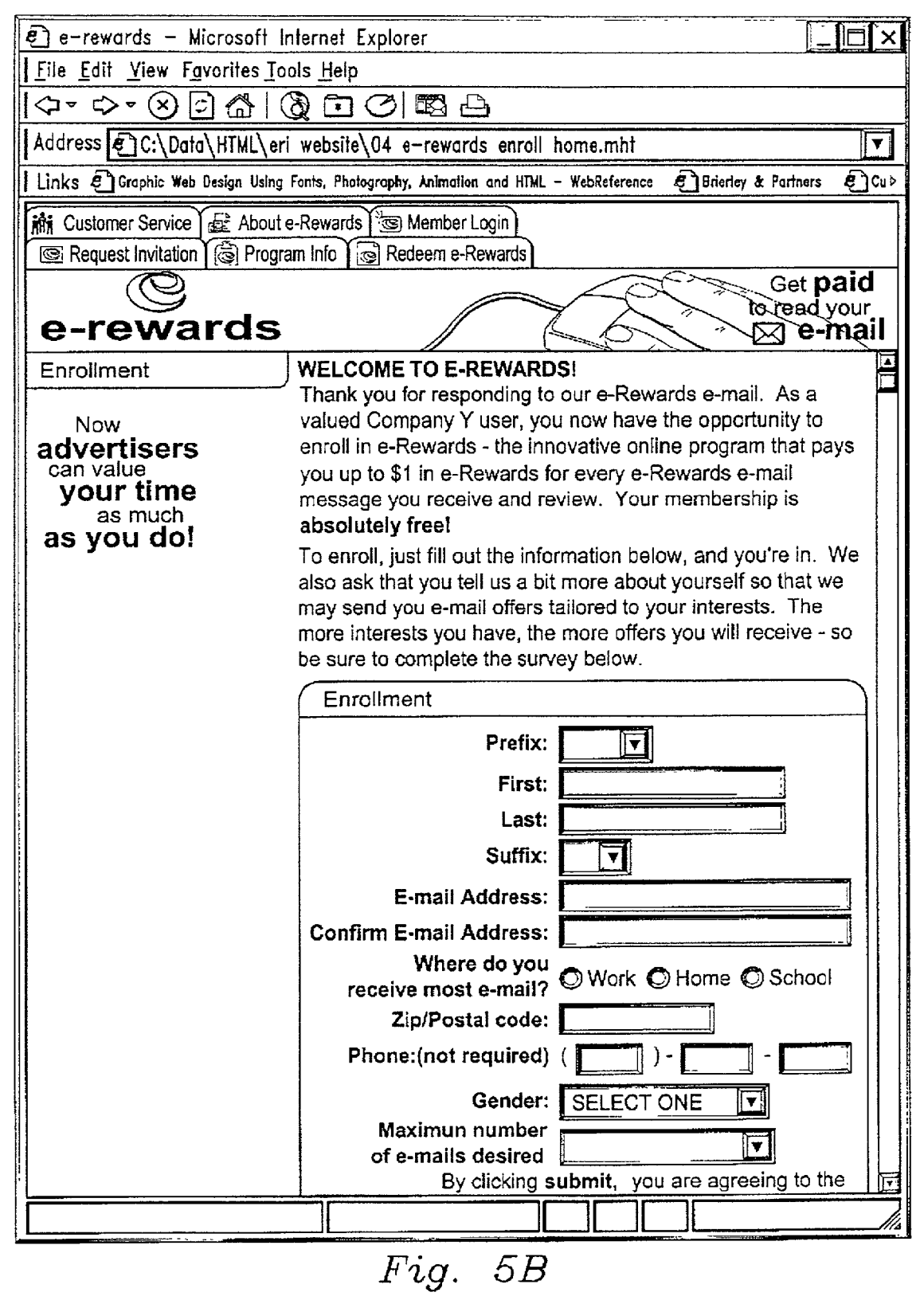
Figure 5C:
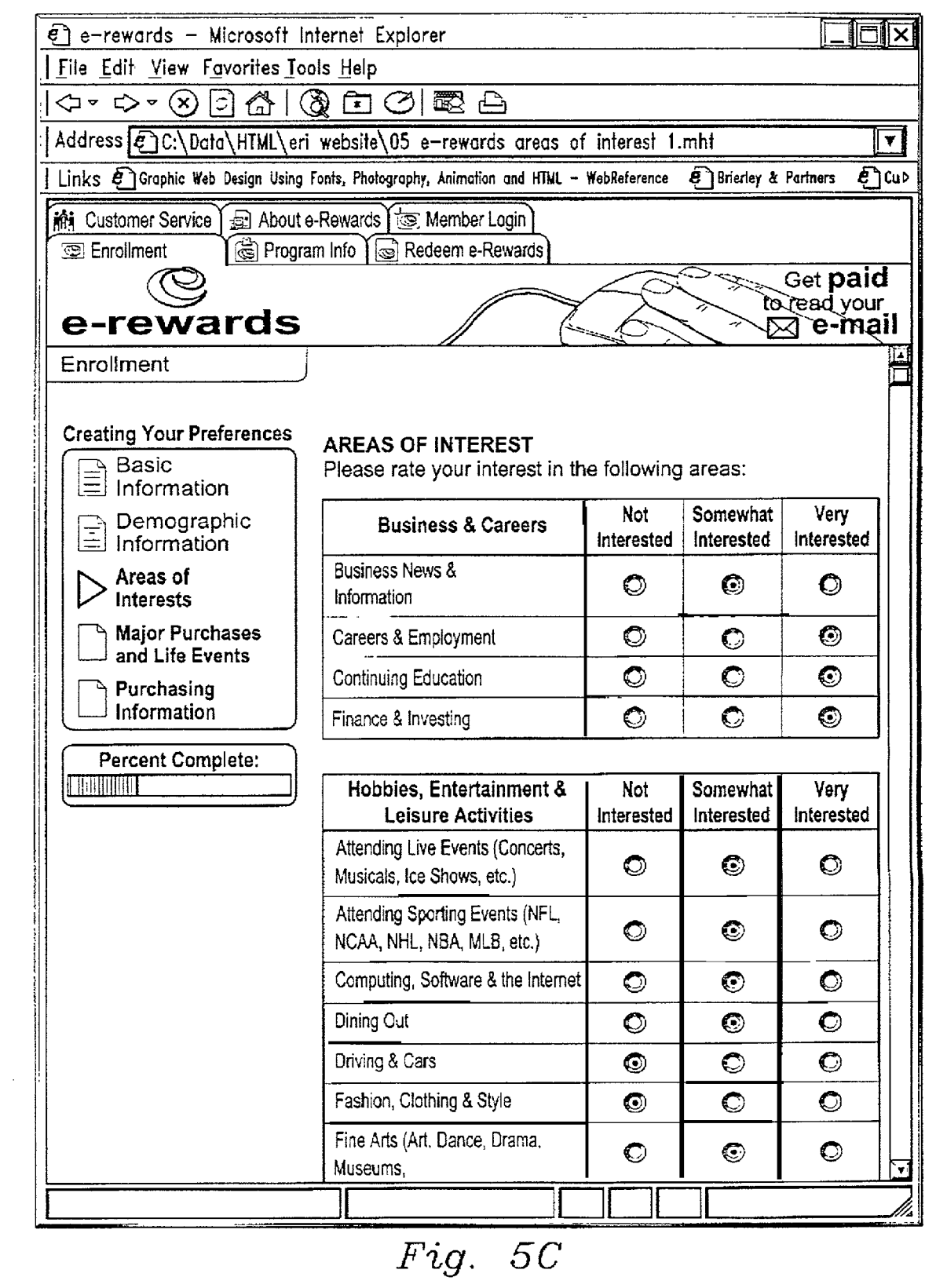
Figure 5E:
Figure 5G:
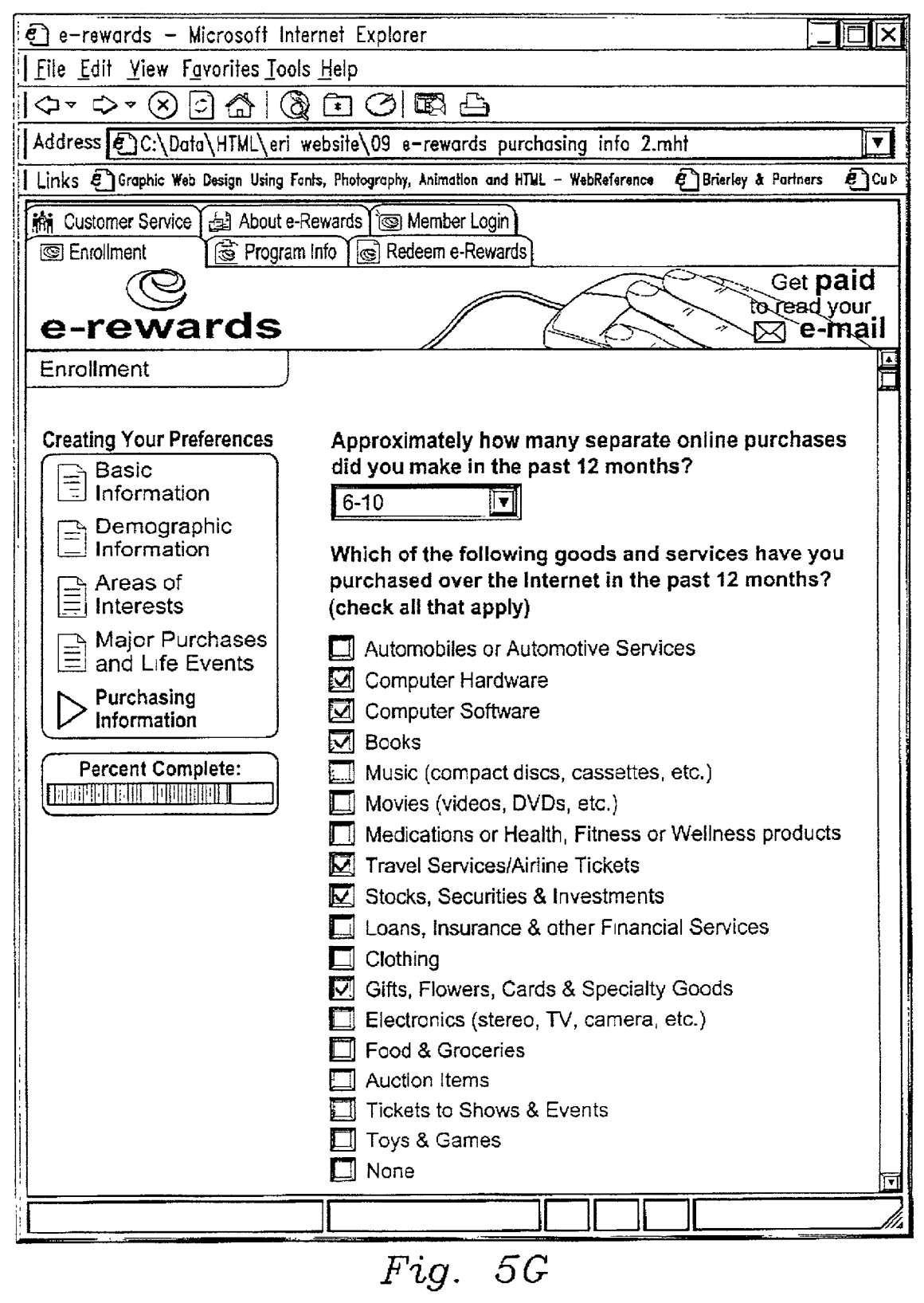
Figure 5H:
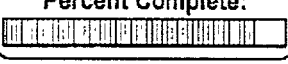

Referring now to FIG. 5A, when the consumer 14 has been invited by either invitation process 50 or 100 to enroll, the consumer 14 can initiate an enrollment and profile creation process 150. At step 152, when the consumer 14 accesses a website identified by the invitation, the invitation code is provided to the promotion operator 18 either manually or via an electronic communication link. FIG. 5B illustrates one example of a screen display for welcoming and encouraging the consumer 14 to enroll.

At steps 154-160 in FIG. 5A, a profile entry in the database 30a is created for the consumer by receiving previously entered information (from the enrollment process) and/or asking the consumer various survey questions. The questions may relate to demographics (e.g., education level), areas of interest (e.g., computers), major purchases (e.g., a house), and purchasing behavior (e.g., an Internet shopper). FIGS. 5C-5H illustrate sample screen displays that are designed to obtain useful information from the consumer 14 during the enrollment process so that the core content of a personal profile for the consumer 14 can be populated.

Figure 5I:
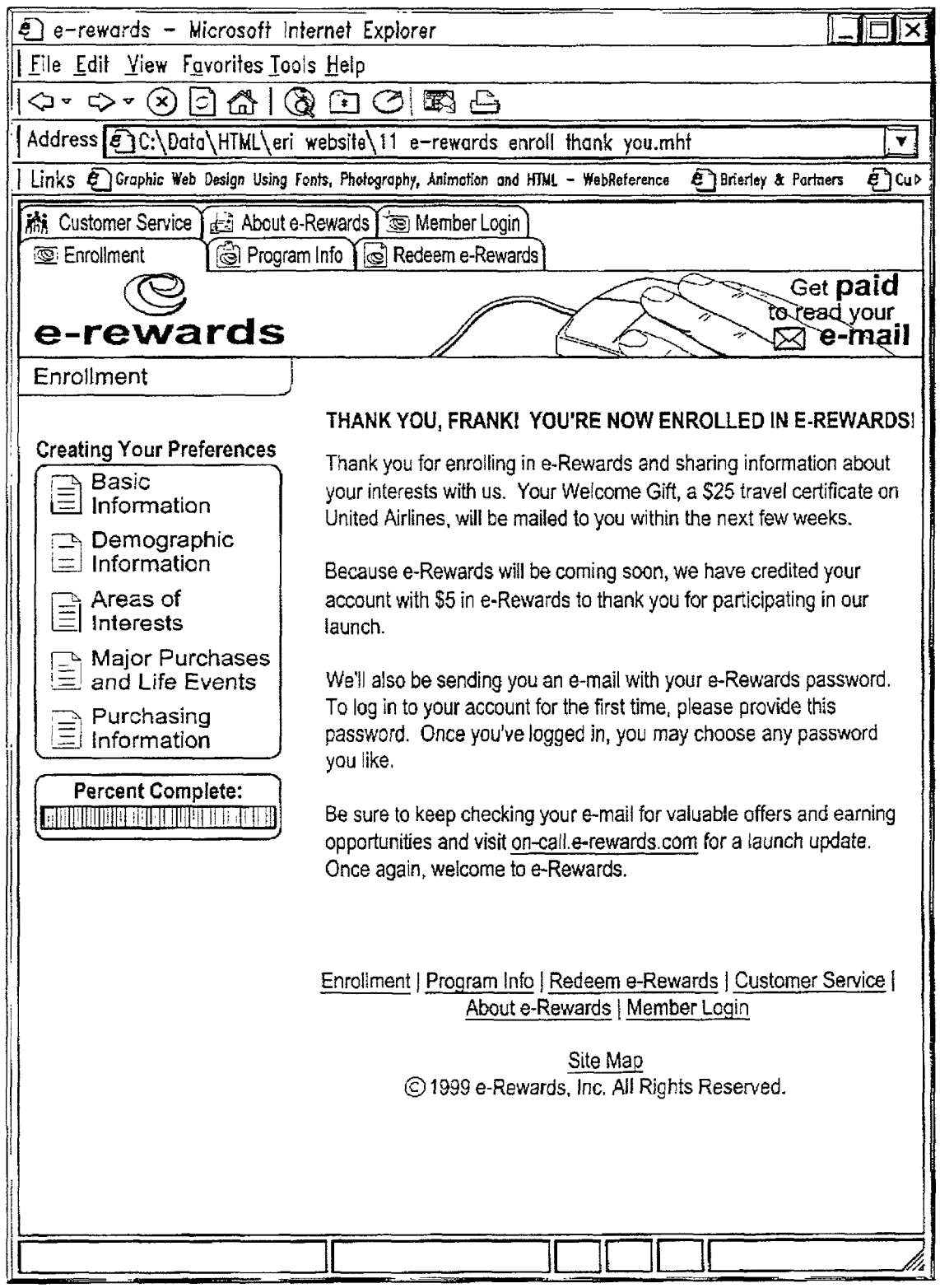

At step 164 in FIG. 5A, once the consumer 14 has completed the information, he may be given a free gift or presented with a choice of gifts. The choices may change based on who invited the member and other factors. The gift may be fulfilled by various means, such as a coupon code, reward points, or an actual item delivered to the consumer 14. With the completion of a successful enrollment, the invited consumer is now a member consumer 14. FIG. 5I shows a screen display that informs the successfully enrolled member consumer 14 that a $25 travel certificate will be mailed to him as a welcome gift, and $5 of reward points has been credited to a rewards account, which is maintained by the promotion operator 18.

Figure 6:
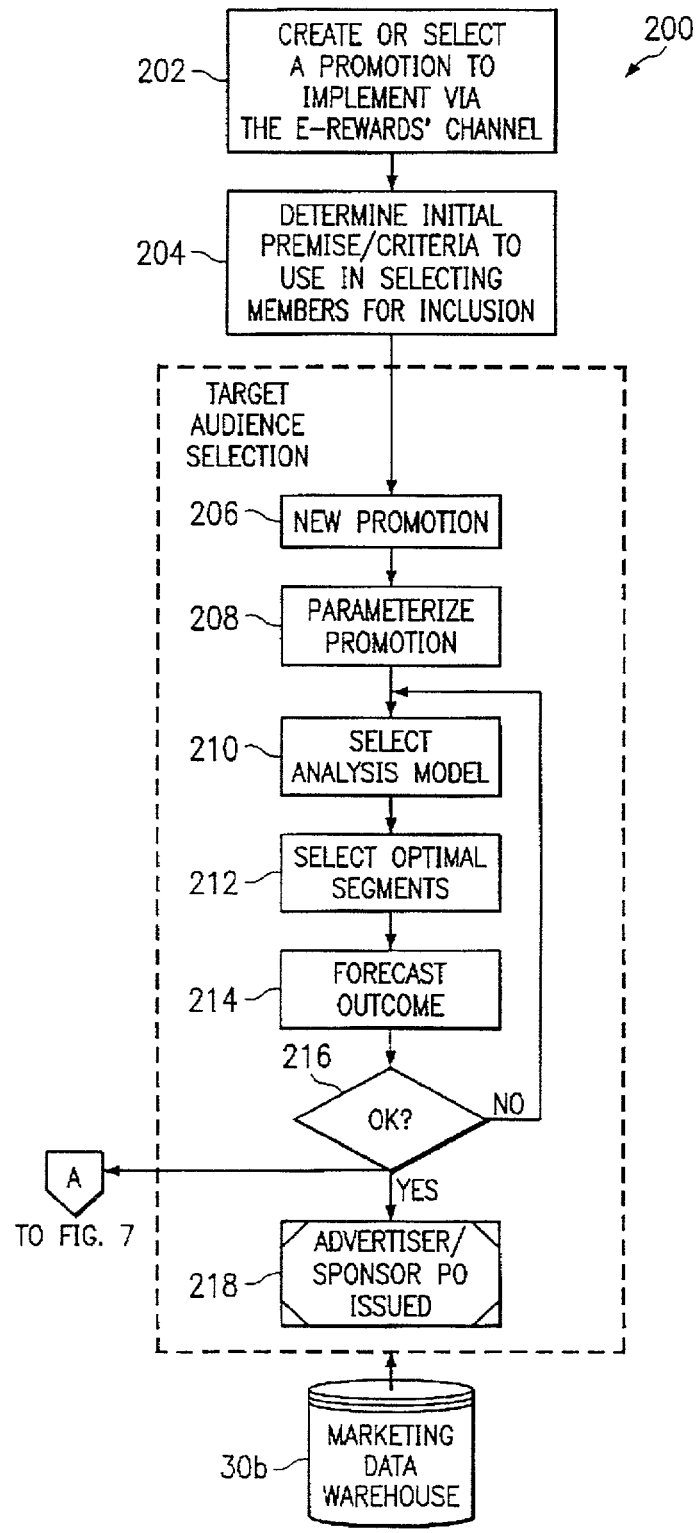
Figure 7:
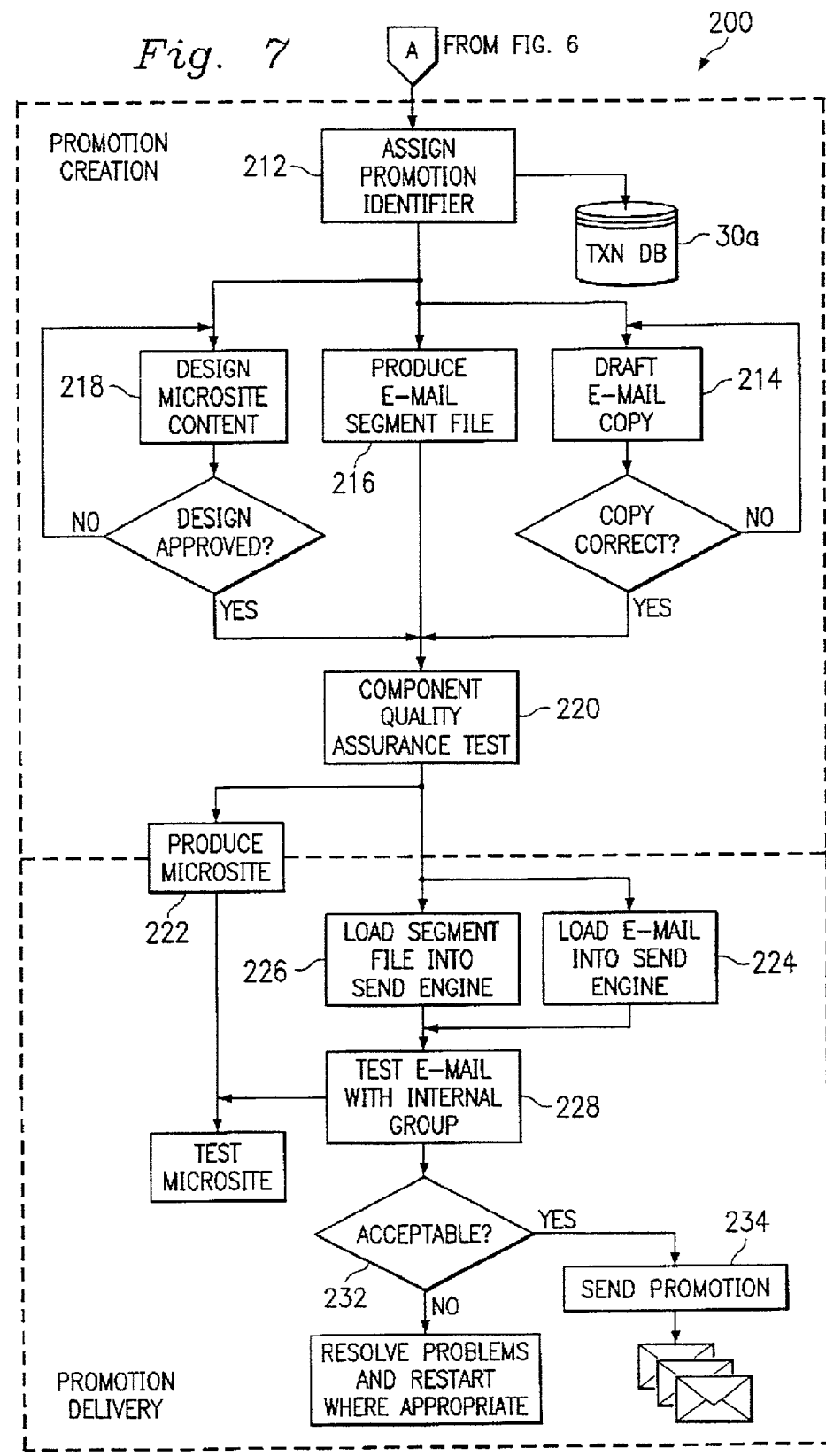

Referring now to FIGS. 6 and 7, the sponsor/advertiser 16 can create a promotion campaign using a process 200 to send promotions to the member consumers 14. At step 202, in the present embodiment, a promotion is produced and delivered by the promotion operator 18. At steps 204-216, the promotion operator 18 coordinates with the sponsor/advertiser 16 to determine the content of the promotion, and to identify potential recipients of the promotion. The promotion operator 18 may also use the marketing database 30b to determine which member consumers 14 should receive the promotion, discussed in greater detail below.

Various characterizations can be made concerning the promotion. At step 206, it is determined whether the promotion has been provided before. At step 208, the promotion is parameterized. For example, is the promotion an especially good deal? Is it expensive? This parameterization is used to judge the relative effectiveness of the promotion and to enable the comparison of this promotion with other promotions. At steps 210-216, an analysis model is selected. The analysis model is used to select the group of member consumers 14 (the "segment") to receive the promotion.

At step 216, when a promotion and segment are created, the promotion may be examined again to ensure a good segment is created, and if so, the sponsor/advertiser may approve and issue a purchase order to the promotion operator 18 (step 218). The promotion operator 18 is now ready to execute the promotion.

Referring now to FIG. 7, at step 212, the promotion is assigned an identifier for identifying the promotion in later analysis. If the promotion operator 18 issues the promotion, then an email is created for the segment (step 214), the segment is prepared for distribution (step 216), and a promotion website is designed (step 218). If at step 220 the promotion website is acceptable, then at step 222, the promotion website is placed on the Internet. In addition, at steps 224-234, the promotion is emailed to the member consumers 14 in the segment.

Figure 8A:
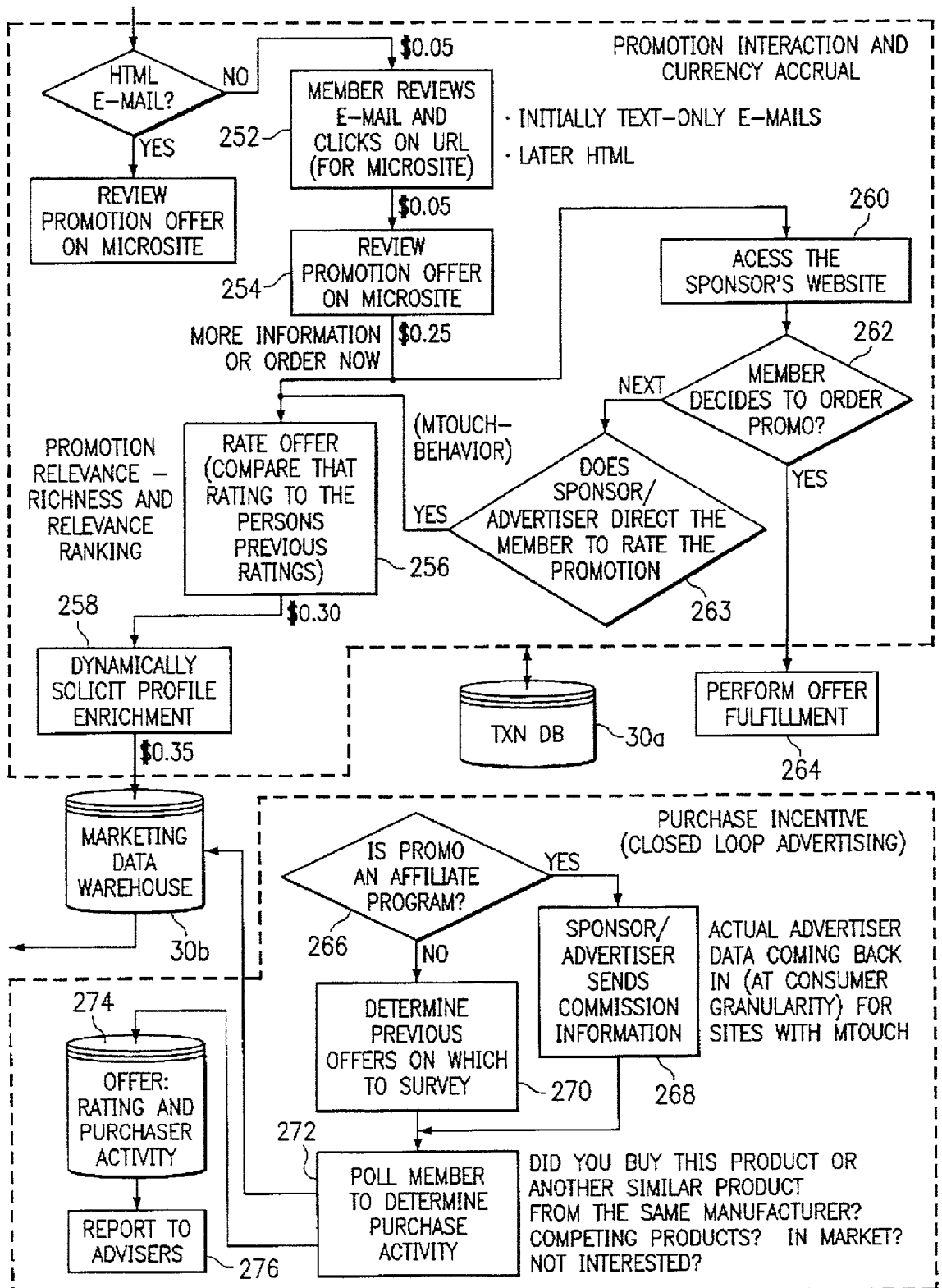

Referring now to FIG. 8A, the promotion operator 18 can interact with each member consumer 14 using an interaction and currency accrual process 250. The process 250 is, at least initially, performed while the member consumer is reading the emails or at the predetermined promotion websites. In addition, the member consumer 14 can be rewarded at different points during the process 250. The rewards may be given through "reward money" or "reward points" which may represent credit or discounts for purchasing goods or services.

Figure 8B:
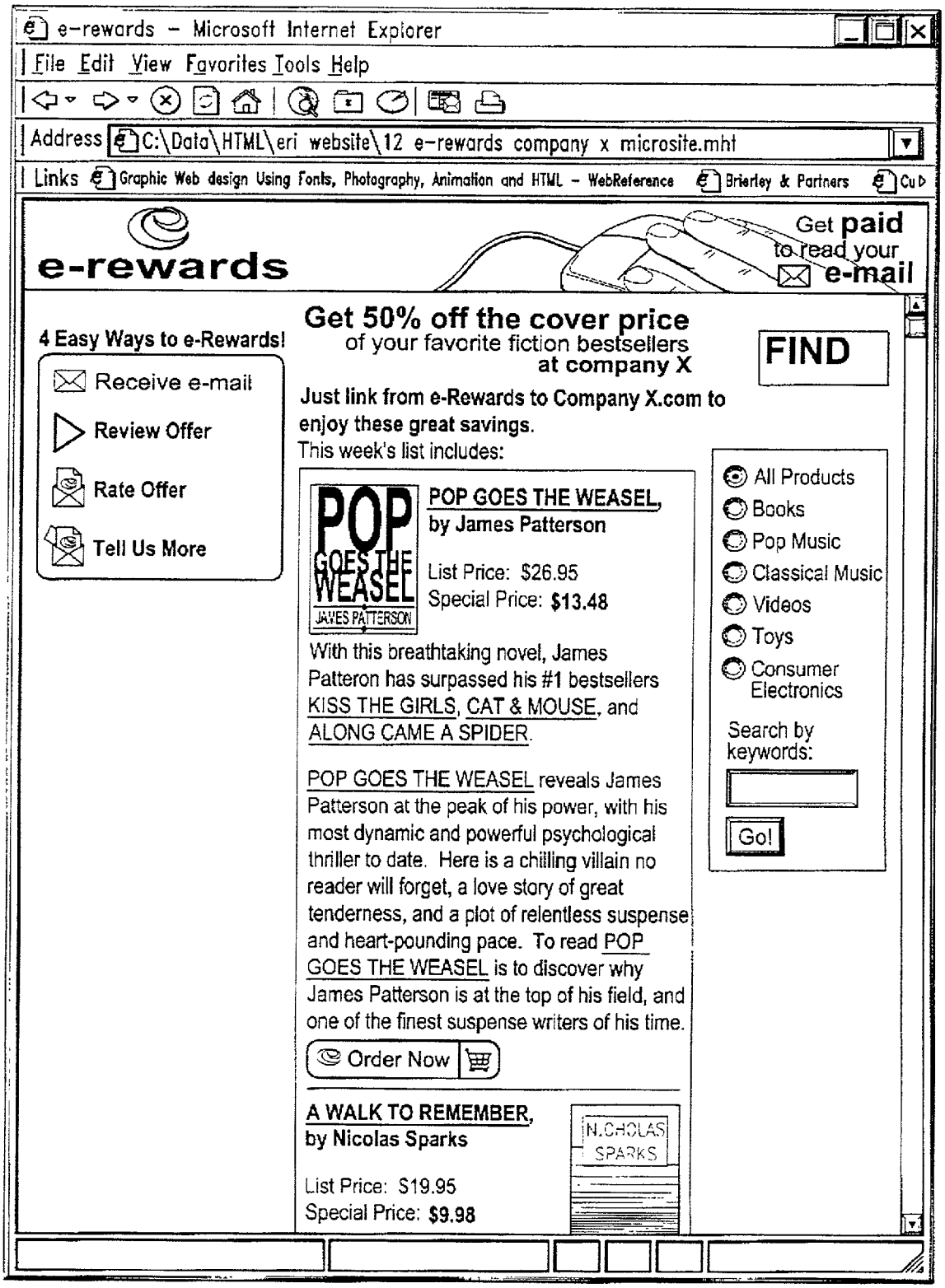

At step 252, the member consumer 14 receives the promotion offer via an electronic communication means and receives a first amount of reward points. For the purpose of illustrating the processes involved, the promotion is deemed to be delivered through emails only although other electronic communication means such as HTML e-mails can also be used. At step 254, the member consumer 14 accesses the promotion website, reviews the details about the promotion, and receives more reward points. FIG. 8B illustrates a screen display for one example of a promotion presented to the member consumer 14 through a website operated by the promotion operator 18.

Figure 8C:
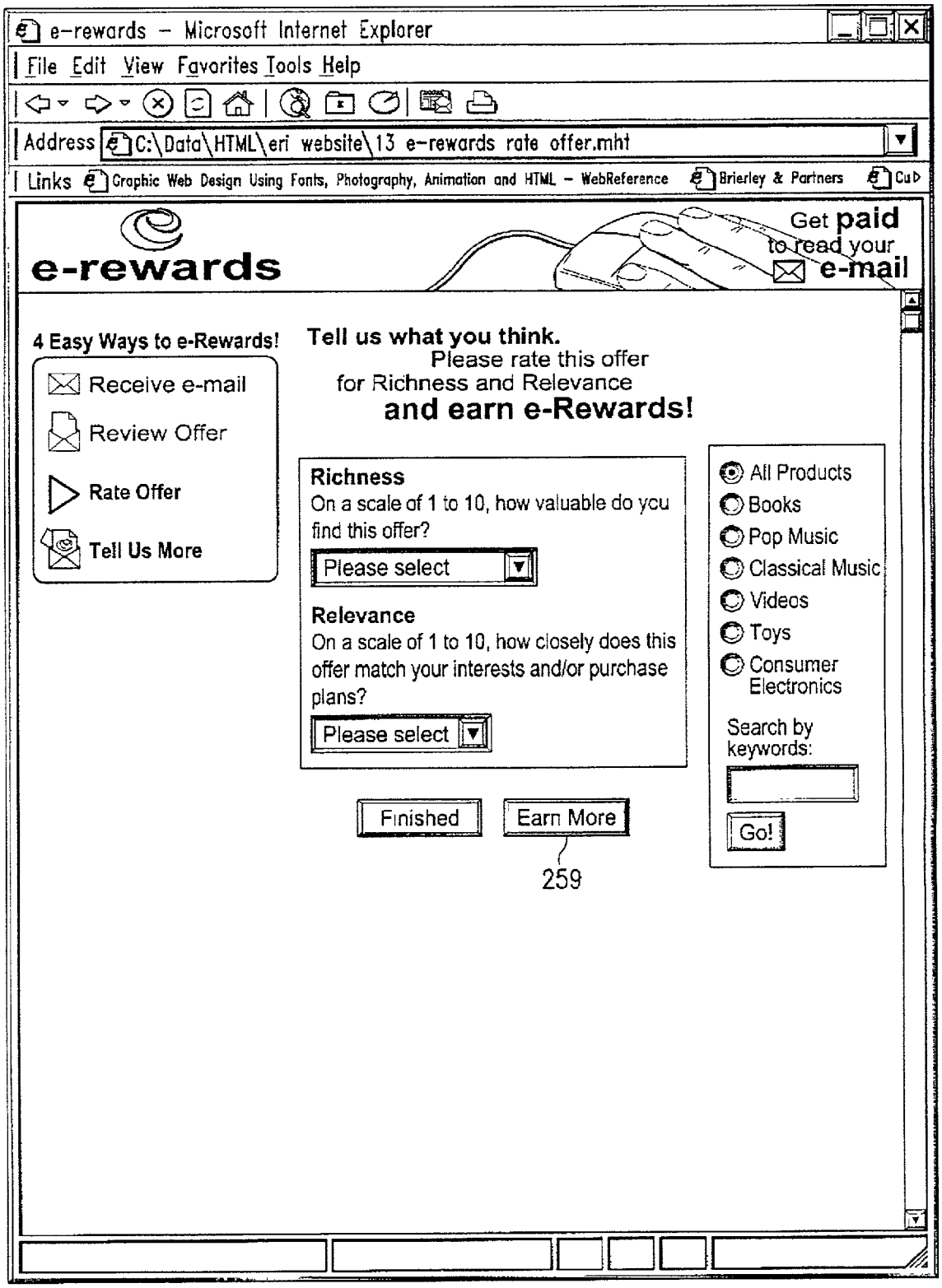

At step 256 of FIG. 8A, the member consumer 14 may rate the promotion or participate in other steps to evaluate the promotion. FIG. 8C illustrates a website wherein the member consumer 14 is asked to rate the promotion (such as the promotion in FIG. 8B) about its richness and its relevance. The richness indicates how valuable a promotion is to the member consumer, and the relevance indicates how closely the promotion matches the interests of the member consumer 14. These two parameters are two of various indicators for the effectiveness of the promotion.

At step 258 of FIG. 8A, the promotion operator 18 may solicit more information from the member consumer 14. The promotion operator 18 may ask the member consumer 14 to describe the relative value of the offered promotion. In addition, the promotion website (e.g., FIG. 8B) may dynamically solicit the member consumer 14 for information relating to other promotions (which may or may not be related to the present promotion).

Figure 8D:
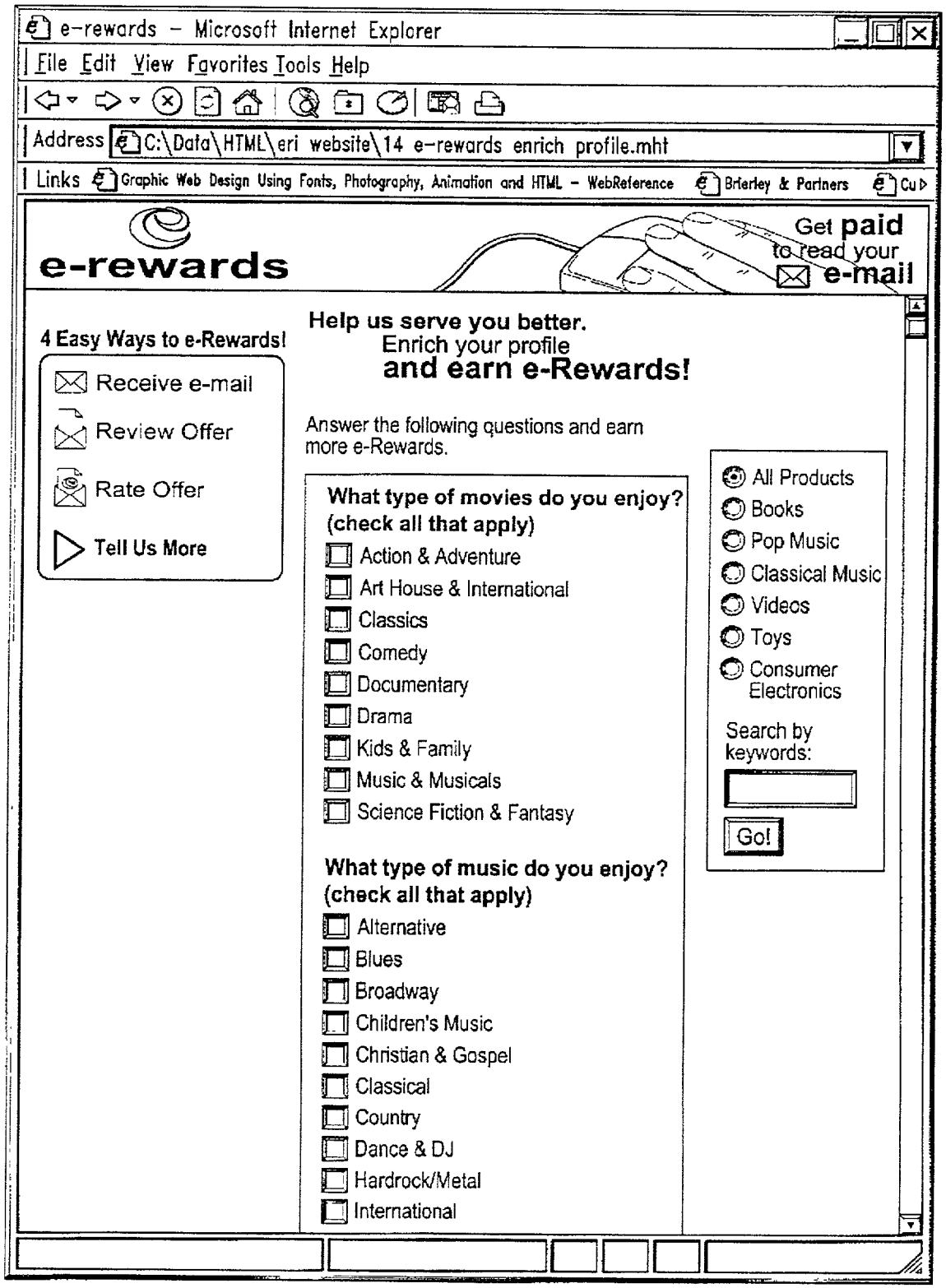

In the example of FIG. 8C, the member consumer 14 is given an opportunity to earn more reward points by clicking a button 259 labeled as "Earn More." By clicking on the button 259, the member consumer is directed to a new website where more questions are asked in exchange for reward points. Referring to FIG. 8D for example, the questions may be a subset of those questions previously asked during the enrollment process and/or may pertain to a specific promotion (the present promotion or future promotions). In this way, the questions can explore undetected interests of the member consumer 14 which are logically connected to the received promotion. The member consumer 14 can be rewarded at the end of this dynamic solicitation process.

Figure 8E:
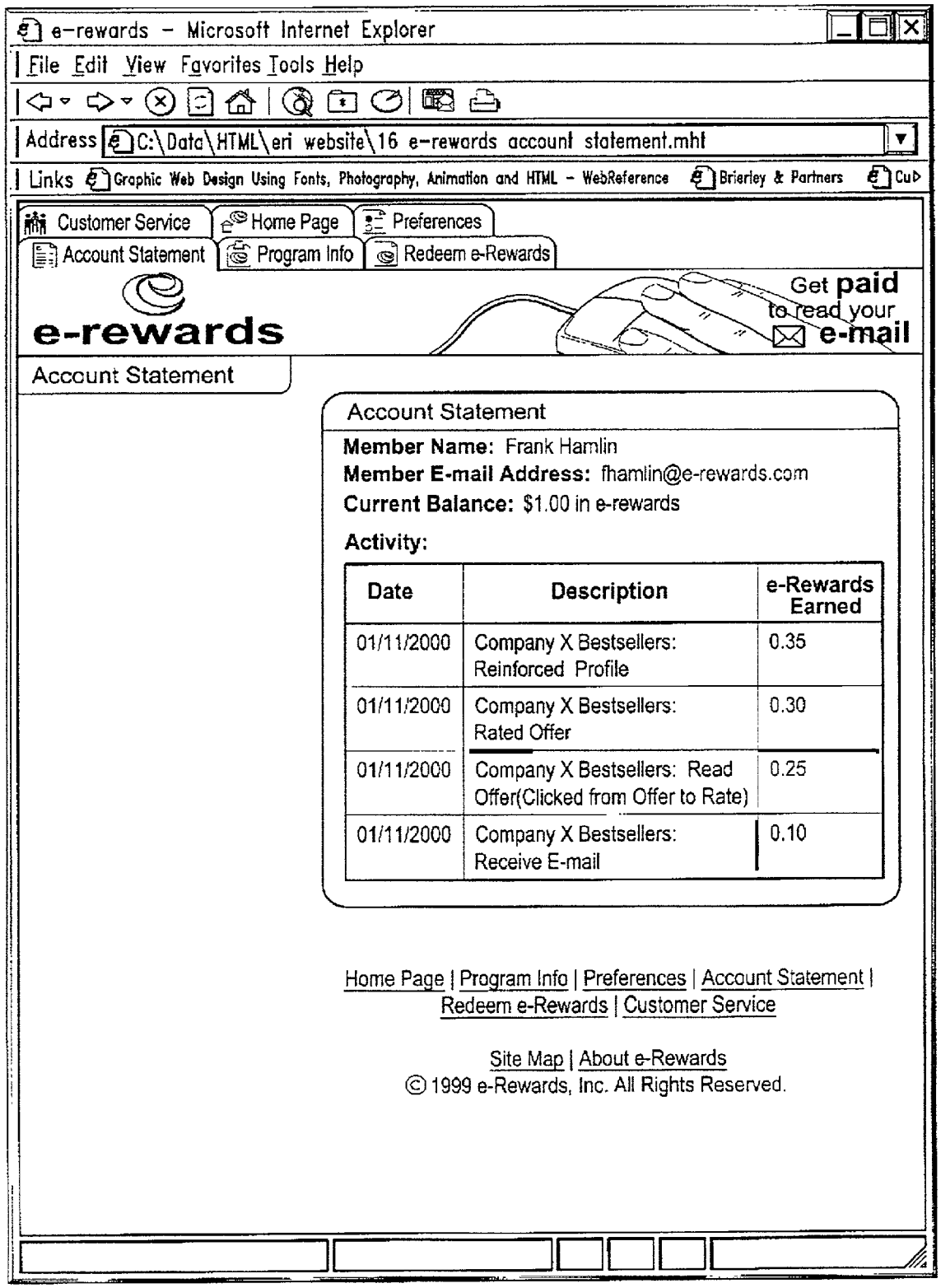

At steps 260-264 of FIG. 8A, if the member consumer 14 shows interest in the promotion, reward points can be provided with each affirmative step the member consumer performs. Referring also to FIG. 8E for example, a website may be presented by the promotion operator 18 to the member consumer 14 at the closing of the promotion. The website of FIG. 8E indicates various amounts of reward points that have been given to the member consumer 14 for his various actions. The reward points are provided to the member consumer 14 for receiving specific emails, reading the promotion, rating the promotion, and updating (reinforcing) his personal profile.

At step 260 of FIG. 8A, the member consumer 14 may access the sponsor's website in order to get more information or to place an order. The member consumer 14 can also receive reward points just for accessing the sponsor's website (such as through a link on the promotion website). After accessing the sponsor's website, at step 262, the member consumer 14 may decide to purchase the promoted product or service. For some promoted products, it can be determined if the member consumer 14 actually "tried" the promoted products. For example, if the sponsor is selling cars, the member consumer 14 may receive reward points for test driving the car.

At step 263, a determination is made as to whether the sponsor 16 is to direct the member consumer 14 to evaluate the promotion. If so, the sponsor 16 may ask the member consumer 14 to return to an evaluation website operated by the promotion operator 18. At step 264, the member consumer 14 may place a purchase order for the goods or services offered as a part of the promotion.

Steps 266-276 relate to interactions between the promotion operator 18 and the sponsor/advertiser 16. At step 266, a determination is made as to whether the current promotion is an "affiliated" promotion program. An affiliated promotion program describes a long term engagement between the promotion operator 18 and the sponsor/advertiser 16 for multiple promotions. Otherwise, the engagement between the promotion operator 18 and the sponsor advertiser 16 is on a per-promotion basis. If the engagement is on a per-promotion basis, then at step 268, the sponsor/advertiser 16 sends a compensation commission back to the promotion operator 18 based on the number of actual purchasers referred by the promotion operator 18 through the promotion. If the engagement is long term (affiliated), at step 270 the sponsor/advertiser 16 provides information to the promotion operator 18 about interactive behavior of the member consumers 14 while at websites controlled by the sponsor/advertiser.

The interactive behavior information may include "clickstream" information (a recordation of links and items selected by the member consumer) and purchase information. The interactive behavior information indicates how the member consumer 14 responds to the promotion, and may include any or all activities from receipt of the promotion email to actual purchases made at the websites of the sponsor/advertiser 16. This information is useful for evaluating the present promotion and for designing better promotions in the future. For example, this information can act as a barometer of how receptive the member consumer 14 is to online marketing and promotion methods. If the member consumer 14 accepts and reads delivered promotions for various kinds of products, this information alone indicates that the member consumer is likely to be influenced by internet promotions in general. If the member consumer 14 always reads and accumulates reward points, but never purchases any promoted items, the member consumer can be identified as one who is only interested in getting free rewards, but is not a serious buyer. The behavior information of the member consumer 14 can also be used to verify the accuracy or modify the true meaning of the information the member consumer 14 voluntarily provides during the enrollment process or other profile enrichment processes.

Additional information can be received through post-promotion evaluations and follow-up surveys. The promotion operator 18 may also combine related promotions in a single follow-up survey. With the profile information and the interactive behavior information on hand, the promotion operator 18 can, at step 272, poll the member consumers 14 about the promoted products and services. Various questions can be designed and asked for the member consumer 14 so that the promotion operator 18 can obtain information about the "decision making process" of the member consumers 14. At step 274, an evaluation of the promotion can be derived and at step 276, a report can be generated and delivered to the sponsors/advertisers 16.

4. Enrichment and Analysis of the Profile Database

Once the profile database 30 has been created, it can be continuously enriched and analyzed to provide important information to the promotion operator 18. The profile database 30 is more effective if it can provide recent and accurate profile information for each member consumer 14. Therefore, it is important that the profile database 30 be continually maintained and enhanced.

An incentive driven member enrollment program, such as described and illustrated in FIG. 5A-5I above, collects information about a member consumer, such as demographic information, area of interest, purchase behavior, and major purchases or life events. With this initial process completed, the profile database 30 has a core content base that is valuable to the sponsor/advertiser 16 and the promotion operator 18. However, having the initial enrollment information alone may not be sufficient to assure that the profile database 30 will be used effectively for the purpose of targeted marketing. For example, if it is found that a particular member consumer is interested in electronic products in general, without further investigation or tracking of his post-enrollment on-line promotion review or purchase behavior, it is difficult to ascertain what specific types of electronic devices in which the member consumer may be interested.

Figure 9:
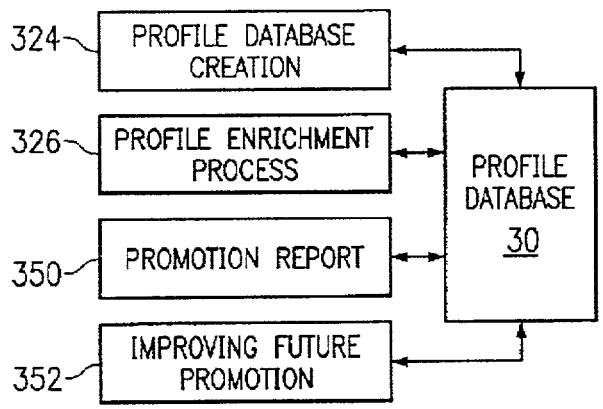

Referring now to FIG. 9, several processes can be used to further enrich, analyze, and utilize the profile database 30. At step 324, after the creation of the profile database, a profile enrichment process 326 may be implemented to follow up with the member consumer 14 to further investigate his evolving personal interests, and thus provide more accurate profile information to enrich the profile database 30.

The profile enrichment process 326 interacts with the member consumer 14 in multiple occurrences provided by the promotion. By taking every opportunity to obtain the member consumers' feedback, the profile database 30 is constantly supplied with and modified by the newest information from the member consumers and reflects the updated interests of each member consumer 14.

Figure 10:
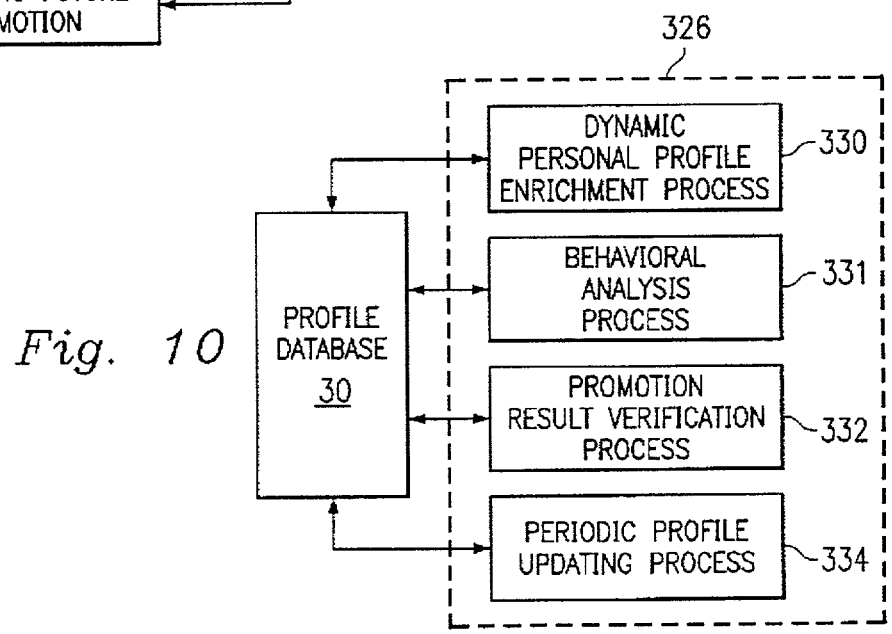

Referring now to FIG. 10, the profile enrichment process 326 includes at least four processes that may be used to enrich the profile database 30. One process is a dynamic personal profile enrichment process 330 which continually enriches a personal profile of each member consumer 14 stored in the profile database. A separate behavioral analysis process 331 is used to extract useful information from a member consumer's behavior relating to the promotion. Another process is a promotion result verification process 332 which verifies the results of specific promotions with the sponsor/advertiser 16. A fourth process is a periodic profile updating process 334 which may be performed through incentive driven surveys. Each of these processes 330, 331, 332, and 334 are discussed in greater detail below.

The dynamic personal profile enrichment process 330 is geared towards asking the member consumer 14 predetermined questions and returning updated profile information to the profile database from the answers provided by the member consumer 14. For example, in the websites operated by the promotion operator, the member consumer may be directed to rate a specific promotion offer in exchange for an incentive such as reward points. Consider for example that the member consumer 14 accesses a website that promotes a particular model (Brand X) computer. The promotion operator 18 questions the member consumer 14 to see how he rates this particular offer in comparison with computer offers of other competitive brands or to other Brand X computers. Other questions regarding the relevance and the richness of the promotion can also be asked so that the promotion operator 18 can obtain information about how close the promotion relates to the interests of the member consumer 14 and how valuable the promotion has presented itself to the member consumer 14. Examples are also shown in FIGS. 8C and 8D, discussed above.

Furthermore, the promotion operator 18 can provide historical information from the profile database 30 to the member consumer 14 to inform the member consumer how he has rated similar promotion offers for this type of product. This gives the member consumer 14 a clear picture to do a "vertical" comparison. By having the member consumer 14 reflect on his past promotion related behavior, and thus provide a more accurate assessment of the quality of the current promotion offer, several benefits are achieved. For one, the profile database 30 gains a most recent update on the evolving interest of this member consumer 14. Moreover, with the evaluation information from each member consumer in the selected segment for the particular promotion, the promotion operator 18 can understand how the selected member consumer segment evaluates the promotion under study in view of promotions in a similar category so that a similar future promotion offer can be designed better for the same segment or a sub-segment of member consumers.

The design of the survey questions are also valuable for investigating the true interests of the member consumers 14. In one embodiment, there are three categories of questions that are prompted to the member consumers. The first category includes promotion specific questions, such as those discussed above. The second category includes profile specific questions. This may include questions that were skipped during the initial enrollment process, "breadth" questions which are not related to the particular promotion under study (e.g., "do you plan on acquiring a new pet?"), and "depth" questions which can be associated with the promotion under study (e.g., "do you already have an internet service provider?"). The third category includes questions that delve into the member consumer's interest levels for new types of promotion offers (e.g., "would you consider planning a vacation over the internet?"). Moreover, the promotion operator 18 can monitor how the member consumer has acted after receiving the promotion, and obtain clickstream data containing the member consumer's interactive behavior information which compliments and validates the information gathered from the aforementioned three categories of questions.

All the questions can be prioritized so that the promotion operator 18 can have a better control of all consumer interactions. Various questions can be generated and provided to the member consumer dynamically in accordance with the priority status of each. For example, if a member consumer is reading about promotion emails regarding airline tickets (which is considered as a sub-category of a larger category regarding travel), he may be asked questions related to the airline ticket sales. Also, questions skipped in the enrollment process but related to the travel category may be asked.

The behavioral analysis process 331 is responsive to how a particular member consumer 14 interacts with on-line promotions of the sponsor/advertiser 16 through promotion emails and multiple websites of the promotion operator. In one example, the member consumer 14 may read emails that contain brief descriptions about products in which he may be interested, and then is directed to the websites which provide more detailed information about such products. The mere fact that the member consumer 14 opts to view certain emails among numerous delivered promotion emails is already an indication of where his interests lie. When the member consumer 14 decides to click through the selected emails to reach corresponding websites, it should be clear to the promotion operator that the member consumer's interests in the products presented in these websites are one level higher than before. Hence, the information derived from the member consumer's interactive behavior will be stored for reflecting the interests of the member consumer 14 and for enriching the profile database. For example, each website is assigned an identification number (WebID), and whenever a website is accessed by a member consumer 14, the promotion operator 18 stores the WebID in connection with the member consumer's own account identification. Therefore, a study of consumer behavior can be conducted on a personal level.

The promotion result verification process 332 may also be performed by the promotion operator 18 to verify promotion results from both the member consumer 14 and the sponsor/advertiser 16. Continuing with the prior example, on the web site advertising the Brand X computer, the promotion operator 18 uses incentives to ask the member consumer 14 about his past promotion-based purchase behavior. For instance, while the member consumer 14 is in the website reading about the Brand X computer, questions may be asked to determine whether the member consumer has purchased any computer related equipment after reading the promotion offers sent by the promotion operator 18. Alternatively, the promotion operator 18 may obtain a list of purchasers from the sponsor/advertiser 16 (Brand X in this example) through on-line or off-line communication channels to determine whether this particular member consumer 14 has indeed purchased anything from Brand X due to successful promotions "pushed" by the promotion operator. In addition, the promotion operator 18 may still get available interactive behavior information of the member consumer regardless of whether or not a purchase is eventually made.

These activities help to enrich the profile database 30 by coordinating purchase behavior to the member consumer's behavior in reading prior promotions. In the Brand X example, it is possible for the promotion operator 18 to store information in the profile database 30 to reflect which promotion emails advertising computers this member consumer 14 has read and which model of computer he eventually purchased. If the member consumer 14 has purchased a promoted "Brand Y" computer in lieu of a Brand X computer, the profile database 30 can provide information for a comparison between these two different promotions and give an indication about why the member consumer made his decision. For the promotion operator 18, it would be important to know whether the purchase decision of the member consumer 14 is swung by the design of the promotion, price of the promoted products, or any other factors.

Figure 11A:
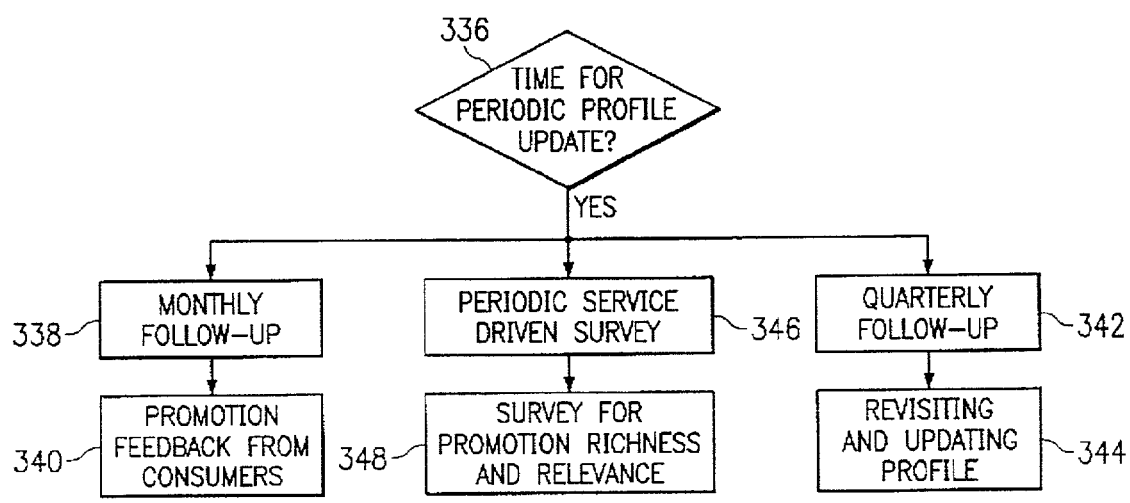

Referring also to FIG. 11A, in addition to the above mentioned profile database enrichment processes 330 and 332, the periodic profile updating process 334 may be performed through incentive driven surveys. At step 336, the promotion operator 18 determines whether the periodic profile updating process 334 should be triggered based on some predetermined criteria. If so, several different surveys may be implemented.

Figure 11B:
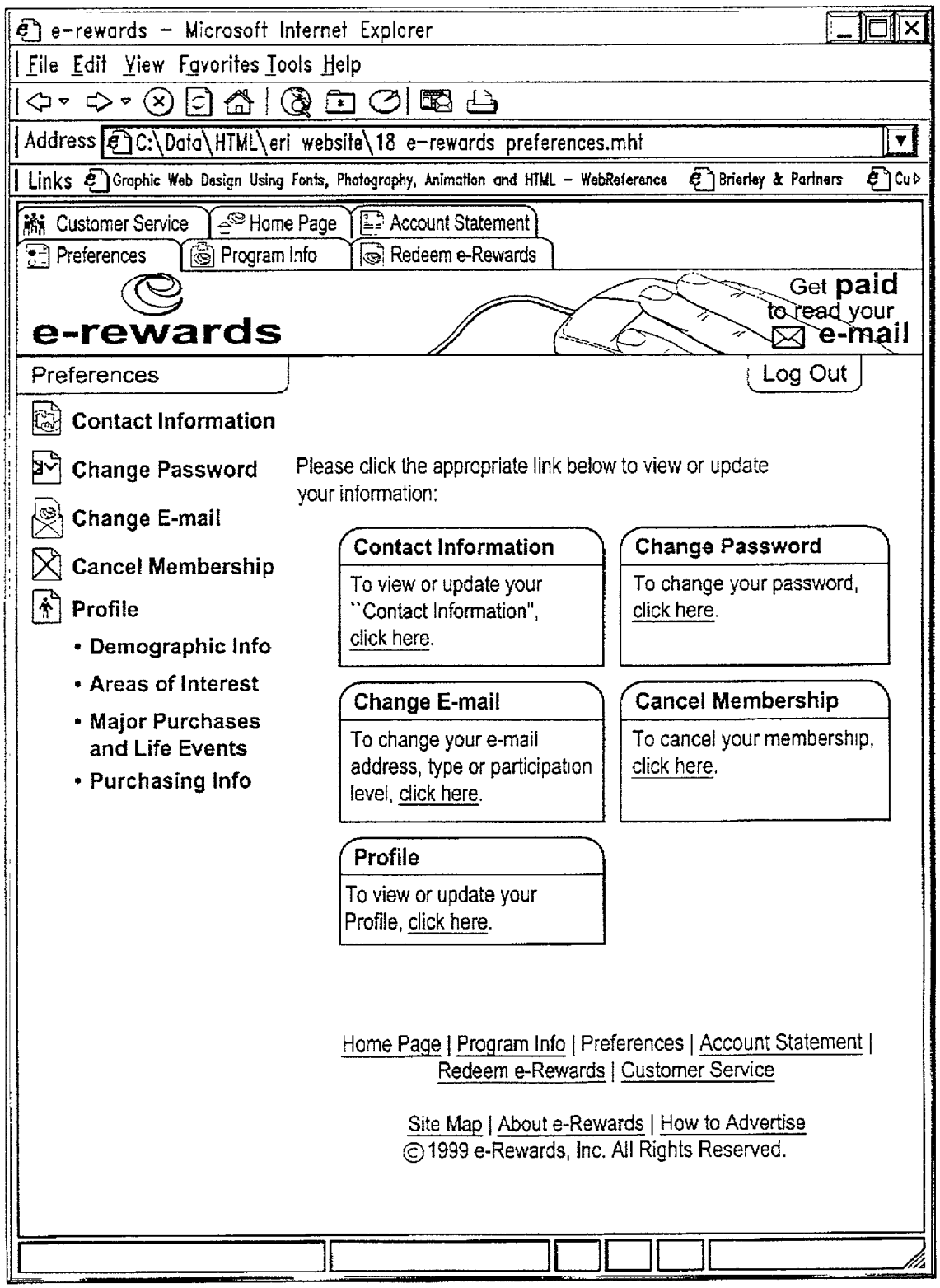
FIGS. 11B-11D and 12B-12C illustrate screen displays for illustrating database enrichment and profile analysis processes of the promotion system and the method of FIG. 2.
Figure 11C:
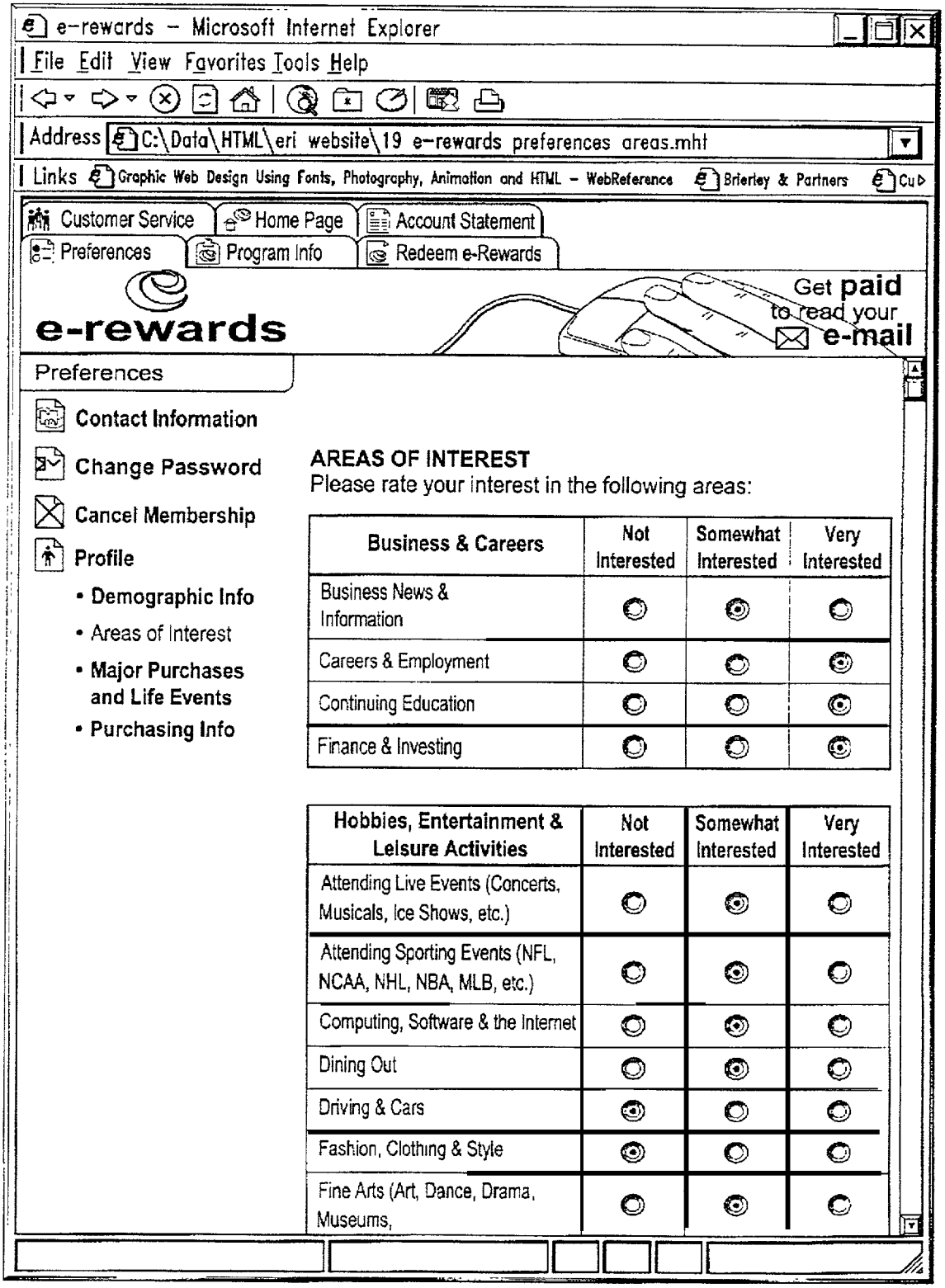
Figure 11D:

FIG. 11B illustrates a website to which the member consumer is directed during the various profile database enrichment processes or the periodic profile updating process 334. The member consumer 14 can be further directed to answer questions such as those described in FIGS. 11C-11D from which the newest information about the member consumer 14 can be derived.

A monthly follow-up survey 338 presents a list of all promotion offers that have been sent to the member consumer 14 in the past month (or other period of time) and checks whether the member consumer has made any purchase based on these promotion offers. The member consumer 14 can be directed to a website to provide his feedback as shown at step 340. The member consumer 14 may then fill out a form that indicates whether he has purchased the promoted product, purchased a competing product, still considers to purchase the product, or is not presently interested in the product at all. In exchange for the member consumer's response, an incentive, e.g. reward points, may be given to the member consumer 14 which can be redeemed on another website run by the promotion operator 18.

A quarterly follow-up survey 342 may also be used. In this survey, the promotion operator 18 offers the member consumer 14 rewards in return for revisiting and updating his profile. At step 344, the member consumer 14 may update the profile database 30 in response to various questions. The profile may use the questions that have been asked during the previous quarter, as well as new questions that the promotion operator 18 believes to be important for enhancing the accuracy of the profile database 30. It is understood that the follow-up survey can be conducted in different time periods as well, as long as it provides current updates to the profile database 30.

A periodic service driven survey 346 is directed to member consumers 14 who have shown a negative interest in the promotions, such as those who have not clicked through promotion emails to the websites that describe details of the offers, or who have given low ratings for certain promotions. At step 348, a compiled list of previous promotions may be presented to the member consumer 14, including his past actions regarding these promotions. Further, the survey asks questions to confirm whether the member consumer 14 indeed has no interest in this type of product, or whether his rejections of these promotions are due to higher-than-expected prices, or any other reasons.

Referring again to FIG. 9, a promotion report 350 can use the profile database 30 for reporting the effect of promotions for the benefit of the sponsor/advertiser 16 and the promotion operator 18. The effectiveness of any promotion can depend on how closely the segment of member consumers 14 can be identified. A post-promotion report on how well the promotion has impacted the member consumers 14 may be important and valuable to future promotions and product sales. The profile database 30 allows the promotion operator 18 to analyze all important aspects of the profile information and compile a report assessing the quality of the promotion offers.

Still taking the Brand X computer promotion offer as an example, for each member consumer 14, the promotion operator 18 can find out the rating of each related computer promotion offer in which the member consumer has given. For instance, if a promotion for Brand Y computers was rated at 2.5 points, a promotion for Brand Z computers was rated at 4.5 points, and a promotion for Brand X computers was rated at 3.5, it becomes evident that this member consumer gives a 3.5 average rating for computer associated promotions. Another member consumer may have a different average rating number for the same three rounds of promotions. Then, the promotion operator 18 can also compile various reports based on statistical distributions of data. For instance, a normalized value of average ratings for all computer promotions by all the member consumers who have received these promotions can be obtained. A report showing the normalized value for the Brand X computer promotion can then be produced. Further, a variance or standard deviation can also be created based on the data stored in the profile database to show a rating gap among the member consumers.

Figure 12B:
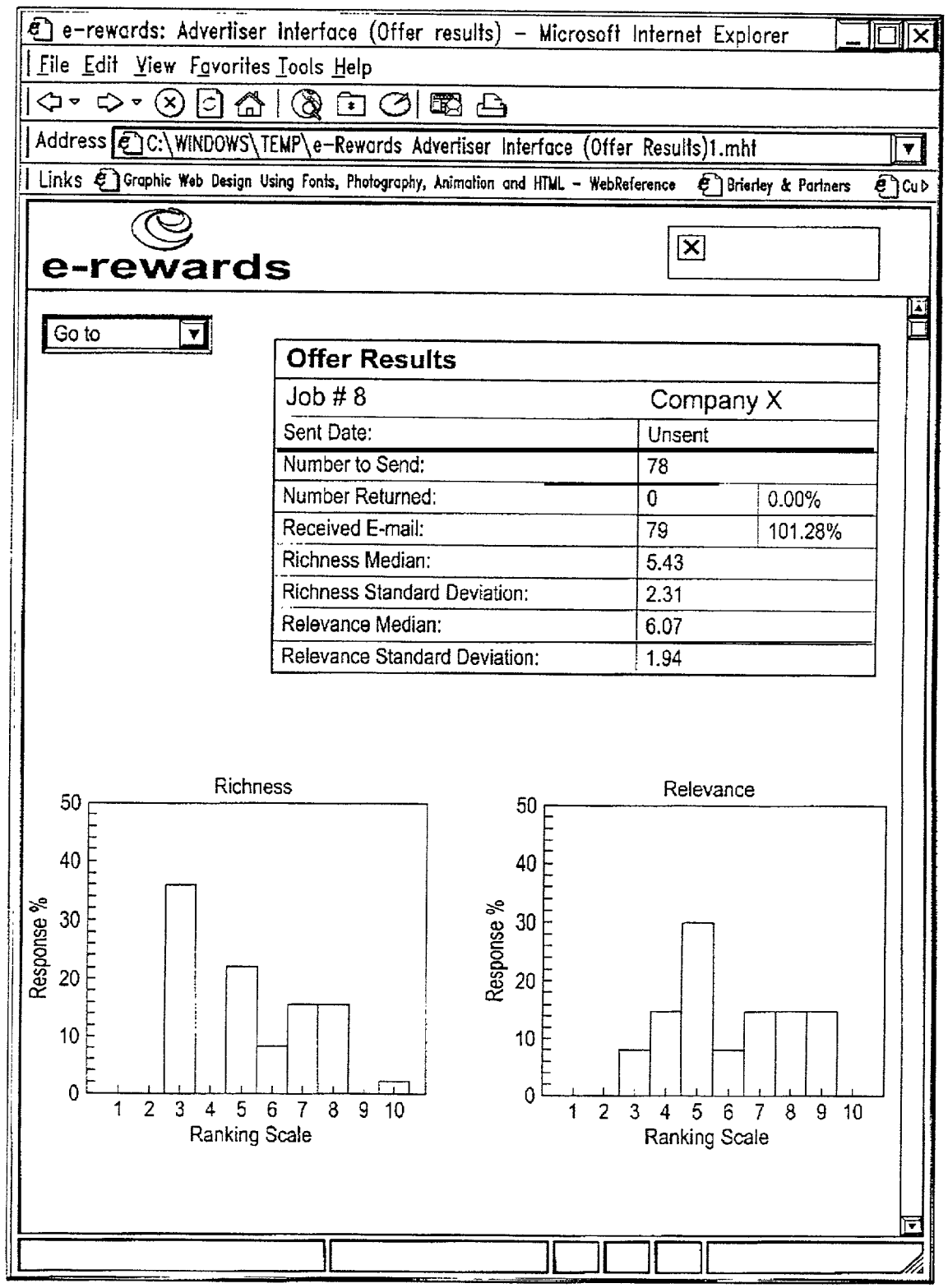
Figures 12C, 13:
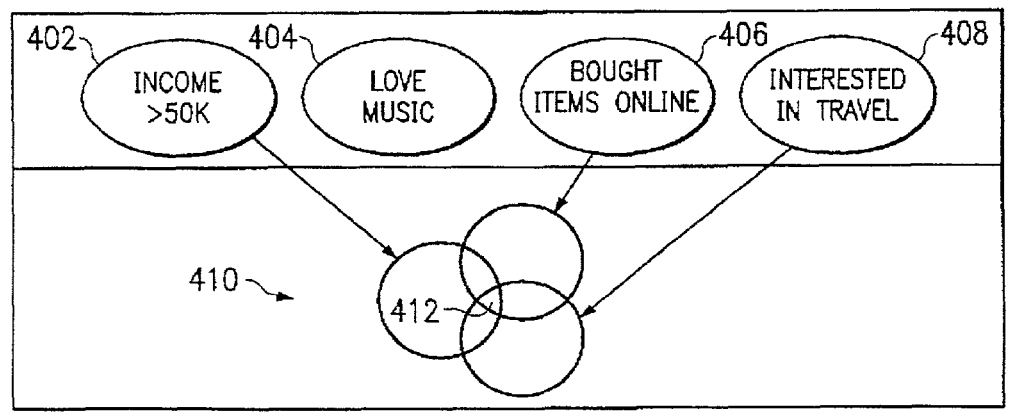
FIG. 13 is a Venn diagram for illustrating target group selection for the method of FIG. 2.

The promotion operator 18 can also generate a report showing an average rating of all the promotions a particular member consumer has received and rated in a predetermined time period. This provides a clear picture of where the current promotion stands in a spectrum of promotions for this member consumer. FIGS. 12A-12C illustrate websites including the reports on the promotions. FIG. 12A gives the promotion operator 18 a summary view of a series of promotions regarding their "click-through" effects. FIG. 12B illustrates detailed statistical data about a particular promotion. The statistical data includes the number of emails sent, the number of emails returned, the richness and relevance rating information provided by the member consumers of the segment, and graphical presentations of this data. FIG. 12C is directed to a cost analysis report to the promotion operator for the promotion under study.

In addition to the promotion report 350, the promotion operator 18 or the sponsor/advertisers 16 can use a future promotion process 352 to focus on a highly selective segment of member consumers 14 by providing certain selection criteria for a future promotion. For example, the advertiser/supplier 16 of Brand X can simply ask the promotion operator 18 to target member consumers 14 who have consistently given a rating above 3.5 for computers. The promotion operator 18 can also analyze the effectiveness of past promotions in depth and utilize the profile database in future promotions for focusing on a premiere segment of member consumers 14. It is evident that selection criteria may not be limited by rating numbers alone, and various factors can also be used.

Referring to FIG. 13, the profile database can also be analyzed using a graphical user interface 400. In one embodiment of the present invention, a graphical user interface 400 incorporating "drag & drop" technology to determine a segment or a targeted group of member consumers 14. The graphical user interface 400 can intelligently characterize sub-segments of the member consumers contained in the profile database 30 by presenting "Buttons" (402-408), each indicating a sub-segment of the member consumers sharing a common characteristic. These Buttons can be predetermined by the promotion operator, or can be defined by the promotion operator dynamically in the design stage of each promotion. In addition, certain "core" Buttons may be constantly available, while the promotion operator 18 still has the freedom of defining new Buttons based on the characteristics of the promotion in design. For example, Button 402 represents (links to) all member consumers who enjoy an annual income of more than $50 k, Button 404 represents the member consumers who have indicated that they love music, Button 406 shows those who have bought items through online transactions, and Button 408 connects to those who have expressed their interests in travel. The graphical user interface 400 can have as many Buttons as the profile database 30 can be divided by single features. The promotion operator 18, in order to identify a targeted group for a promotion, needs only to drag and drop selected Buttons to a predetermined area 410 on the computer screen. An overlapping area 412 among these dropped Buttons represents member consumers who share the selected features. Consequently, a segment of the member consumers 14 is defined by the overlapping area 412.

The analysis may also include various attempts to achieve an optimal segment of the member consumers, including predicting the response from the member consumers 14 (which may later be compared with the actual results to further improve the prediction process). This analysis may also be used to determine a cost of the promotion, which may then be forwarded to the sponsor/advertiser 16.

As mentioned above, to mitigate the possibility that some member consumers 14 may be unwilling to spend time and effort to disclose their evaluation of the promotions or their purchase behavior, an incentive such as reward points may be provided. The accumulated reward points can be redeemed for products in a website operated by the promotion operator 18. This also establishes a relationship between the promotion operator 18 and the member consumers 14, which in turn ensures that the member consumers are more likely to be associated with the promotion operator for an extended period of time. By having the member consumers 14 access the promotion operator's websites as often as possible, the relationship is enhanced as the consumer feels more and more comfortable in dealing with the promotion operator 18. As a result, the member consumer 14 will be more likely to participate in the promotions and be more willing to disclose their comments and evaluations of the promotions.

In some embodiments, the member consumer 14 is granted access to his own profile as stored in the profile database 30. A log-in name and password protection, or similar privacy protection mechanism, is used to ensure that there is no excessive exposure or illegal use of the stored information. While accessing his own profile, the member consumer 14 can view all historical changes that have been made to his profile. The member consumer 14 may also have the ability to inform the promotion operator 18 that he does not wish to receive future promotion emails, or not for a predetermined period of time.

While the invention has been particularly shown and described with reference to the preferred embodiment, it will be understood by those skilled in the art that various changes in form and detail may be made therein without departing from the spirit and scope of the invention, as set forth in the following claims.

What is claimed is:

1. A method for improving online market research, said method comprising:
   receiving, from a first advertiser, a first request to complete a first survey, said first survey associated with requirements of online users qualified to participate in said first survey;
   retrieving, from a user profile database, user profile information relating to a plurality of online users, wherein:
      said plurality of online users previously enrolled in an online survey program by submitting user profile information comprising demographic information relating to said user;
   determining a plurality of online users having certain features such that users having said certain features qualify to receive said first survey on behalf of said first advertiser;
   creating a first online user segment of qualifying online users, wherein:
      said first online user segment is created using a selected analysis model that compares said requirements to said retrieved user profile information;
   transmitting said first survey to said first online user segment;
   measuring at least the content of a response of one or more users in said first online user segment;
   measuring at least one of response and behavior of one or more users in said first user segment;
   in response to said measuring, refining said user profile information to update said user profile database, said refining comprising:
      performing a user personal profile enrichment process by (1) asking the user promotion-specific questions, profile-specific questions, and questions relating to the user's interest in new promotions, and (2) providing information relating to historical behavior of said one or more users to prompt said one or more users to provide more accurate responses to said first survey;
      performing a user behavioral analysis process by recording (1) at least one email viewed by said one or more users, (2) and at least one website identification number accessed by said one or more users in conjunction with viewing said at least one email;

performing a user promotion result verification process by confirming if said one or more users has made past purchases of products or services relating to said first survey; and performing a periodic profile updating process by periodically offering said one or more users incentives to provide additional information;

receiving, from a second advertiser, a second request to complete a second survey, said second survey associated with requirements of online users qualified to participate in said second survey;

retrieving, from said updated user profile database, refined user profile information relating to a plurality of online users;

defining a second user segment from said refined user profile information and using a selected analysis model; and transmitting said second survey to said second user segment.

2. The method of claim 1 further comprising:
retrieving refined user profile information from said updated user database to derive a first survey report, said first survey report reflecting the degree to which said first survey impacted one or more users in said first user segment.

3. The method of claim 2 further comprising:
transmitting said first survey report to said first advertiser.

4. The method of claim 1 wherein:
said first survey comprises questions that are prioritized in response to observed consumer behavior.

5. The method of claim 1 wherein:
transmitting a first survey to said online user segment comprises directing said consumer to a website provided by said advertiser to complete said survey.

6. The method of claim 1 further comprising:
receiving, from a third advertiser, a third request to complete a third survey, said third survey associated with requirements of online users qualified to participate in said third survey;

retrieving, from said updated user profile database, second refined user profile information relating to a plurality of online users;

defining a third user segment from said refined user profile information and using a selected analysis model; and transmitting said third survey to said third user segment.

7. The method of claim 1 wherein:
said first survey comprises:
survey specific questions;
profile specific questions; and
questions relating to a consumer interest levels for new types of offers.

8. A system for improving online market research, said system comprising:
a receiver for receiving, from a first advertiser, a first survey, said first survey associated with requirements of online users;

logic coupled to said receiver for retrieving, from a user profile database, user profile information relating to a plurality of online users, wherein:
said plurality of online users previously enrolled in an online survey program by submitting user profile information comprising demographic information relating to said user, and said retrieved user profile information comprises at least some of said demographic information relating to said online users;

logic for determining a plurality of online users having certain features such that users having said certain features qualify to receive said survey on behalf of said advertiser;

a segment engine for creating an online user segment of qualifying online users, wherein:
said online user segment is created using a selected analysis model that compares said requirements to said retrieved user profile information;

a transmitter for transmitting a first survey to said online user segment, said first survey being relevant to said advertiser;

logic for measuring the content of a response of one or more users in said online user segment;

logic for, in response to said measuring, refining said user profile information to update said user profile database, said refining comprising:
performing a user personal profile enrichment process by (1) asking the user promotion-specific questions, profile-specific questions, and questions relating to the user's interest in new promotions, and (2) providing information relating to historical behavior of said one or more users to prompt said one or more users to provide more accurate responses to said first survey;

performing a user behavioral analysis process by recording (1) at least one email viewed by said one or more users, (2) and at least one website identification number accessed by said one or more users in conjunction with viewing said at least one email;

performing a user promotion result verification process by confirming if said one or more users has made past purchases of products or services relating to said first survey; and performing a periodic profile updating process by periodically offering said one or more users incentives to provide additional information; and said transmitter further transmitting said measured response behavior to said advertiser.

9. The system of claim 8 further comprising:
logic for retrieving refined user profile information from said updated user database to derive a first survey report, said first survey report reflecting the degree to which said first survey impacted one or more users in said first user segment.

10. The system of claim 9 wherein said transmitter further transmits said first survey report to said first advertiser.

11. The system of claim 8 wherein said first survey comprises questions that are prioritized in response to observed consumer behavior.

12. The system of claim 8 wherein said transmitting a first survey to said online user segment comprises directing said consumer to a website provided by said advertiser to complete said survey.

13. The system of claim 8 further comprising:
logic for receiving, from a third advertiser, a third request to complete a third survey, said third survey associated with requirements of online users qualified to participate in said third survey;

logic for retrieving, from said updated user profile database, second refined user profile information relating to a plurality of online users;

logic for defining a third user segment from said refined user profile information and using a selected analysis model; and transmitting said third survey to said third user segment.

14. The system of claim 8 wherein:
said first survey comprises:

survey specific questions;
profile specific questions; and
questions relating to a consumer interest levels for new types of offers.

15. A method for improving online market research, said method comprising:
receiving, from an first advertiser, a plurality of online user requirements to qualify as a user that can receive an online survey on behalf of said first advertiser;
in response to said receiving, retrieving, from a user profile database, user profile information relating to a plurality of online users, wherein said user profile database comprises:
a transaction database storing information specific to said online users that is obtained from interactions between said online users and said advertiser, and
a marketing database, in communication with said transaction database, storing information specific to said advertiser and extracts of data from said transaction database;
creating, using information read from said marketing database, an online user segment, said online user segment comprising a subset of said plurality of online users sharing said qualification requirements;
transmitting said first survey to said online user segment, said first survey being relevant to said qualification requirements;
receiving, at least partially in response to said transmitting said survey, user response information from at least one user in said online user segment;
creating, from said user response information, a first survey report, said first survey report reflecting the degree to which said first survey impacted one or more users in said first user segment and comprising of said first survey an average rating all surveys said one or more users has received and rated in a predetermined time period; and
transmitting said first survey report to said first advertiser.

16. The method of claim 15 further comprising:
measuring user response behavior and, in response to said measuring response behavior, updating said user profile information and identifying an updated set of surveys for which a user qualifies based on said updated profile information.

17. The method of claim 16 wherein:
updating said data base in response to measuring said response behavior comprises:
a dynamic personal profile enrichment process that continuously enriches a personal profile for each online user;
a behavior analysis process that extracts online user behavior relating to at least said first survey;
a result verification process that verifies the results of at least said first survey with said advertiser; and
a periodic profile update process that conveys incentives to said online user for participation in at least said first survey.

18. The method of claim 15 wherein:
said first survey comprises questions that are prioritized in response to observed consumer behavior.

19. The method of claim 15 wherein:
transmitting a first survey to said online user segment comprises directing said consumer to a website provided by said advertiser to complete said survey.

20. The method of claim 15 wherein:
said first survey comprises:
survey specific questions;
profile specific questions; and
questions relating to a consumer interest levels for new types of offers.

21. A system for improving online market research, said system comprising:
a receiver for receiving, from an advertiser, a plurality of online user requirements to qualify as a user that can receive an online survey on behalf of said advertiser;
logic for, in response to said receiving, retrieving, from a user profile database, user profile information relating to a plurality of online users, wherein said user profile database comprises:
a transaction database storing information specific to said online users that is obtained from interactions between said online users and said advertiser, and
a marketing database, in communication with said transaction database, storing information specific to said advertiser and extracts of data from said transaction database;
logic for creating, using information read from said marketing database, an online user segment, said online user segment comprising a subset of said plurality of online users sharing said qualification requirements;
a transmitter for transmitting a first survey to said online user segment, said first survey being relevant to said qualification requirements;
said receiver further receiving, at least partially in response to said transmitting said survey, user response information from at least one user in said online user segment;
logic for creating, from said user response information, a first survey report, said first survey report reflecting the degree to which said first survey impacted one or more users in said first user segment and comprising of said first survey an average rating all surveys said one or more users has received and rated in a predetermined time period.

22. The system of claim 21 further comprising:
logic for measuring user response behavior and, in response to said measuring response behavior, updating said user profile information and identifying an updated set of surveys for which a user qualifies based on said updated profile information.

23. The system of claim 21 wherein:
said first survey comprises questions that are prioritized in response to observed consumer behavior.

24. The system of claim 21 wherein:
transmitting a first survey to said online user segment comprises directing said consumer to a website provided by said advertiser to complete said survey.

25. The system of claim 22 further wherein said logic for updating said data base in response to measuring said response behavior comprises:
dynamic personal profile enrichment process logic that continuously enriches a personal profile for each online user;
behavior analysis process logic that extracts online user behavior relating to at least said first survey;
result verification process logic that verifies the results of at least said first survey with said advertiser; and
periodic profile update process logic that conveys incentives to said online user for participation in at least said first survey.

26. The system of claim 21 wherein:
said first survey comprises:
survey specific questions;
profile specific questions; and questions relating to a consumer interest levels for new types of offers.

\* \* \* \* \*